(12) United States Patent
Osborn et al.

(10) Patent No.: US 10,551,406 B2
(45) Date of Patent: Feb. 4, 2020

(54) ACOUSTIC STRUCTURAL REFLECTION INTERFERENCE MITIGATION SYSTEMS, METHODS, AND DEVICES

(71) Applicant: Anemoment LLC, Longmont, CO (US)

(72) Inventors: Stephen Osborn, Longmont, CO (US); Mark Henault, Westminster, CO (US); Elizabeth Osborn, Longmont, CO (US); Stefan Elsener, Westminster, CO (US)

(73) Assignee: Anemoment LLC, Longmont ( * ) Notice: Subject to any disclaimer, the term of this patent is extended or adjusted under 35 U.S.C. 154(b) by 0 days.

(21) Appl. No.: 15/957,646

(22) Filed: Apr. 19, 2018

(65) Prior Publication Data

US 2018/0313865 A1 Nov. 1, 2018

Related U.S. Application Data

(60) Provisional application No. 62/487,876, filed on Apr. 20, 2017, provisional application No. 62/614,407, filed on Jan. 6, 2018.

(51) Int. Cl.
*G01P 5/24* (2006.01)
*G01P 13/02* (2006.01)
*G01P 13/04* (2006.01)

(52) U.S. Cl.
CPC .............. *G01P 5/245* (2013.01); *G01P 13/02* (2013.01); *G01P 13/045* (2013.01)

(58) Field of Classification Search
CPC ................................ G01P 5/245; G01P 13/02
USPC .......................................... 73/170.13, 290 V
See application file for complete search history.

(56) References Cited

U.S. PATENT DOCUMENTS

| | | | |
|---|---|---|---|
| 3,727,454 A | 4/1973 | Courty | |
| 4,787,252 A | 11/1988 | Jacobson | |
| 4,890,488 A * | 1/1990 | Pincent | G01P 5/18 |
| | | | 73/170.13 |

(Continued)

OTHER PUBLICATIONS

"ATMOS 22 Manual," METER Group, Inc., Copyright 2017-2019, available at http://library.metergroup.com/Manuals/20419_ATMOS22_Manual_Web.pdf.

(Continued)

*Primary Examiner* — John Fitzgerald
*Assistant Examiner* — Rodney T Frank
(74) *Attorney, Agent, or Firm* — Wilson Patent Law, LLC

(57) ABSTRACT

Methods, systems, and devices for acoustic structural reflection interference mitigation are provided in accordance with various embodiments. For example, some embodiments may provide for structural reflection interference mitigation for compact three-dimensional ultrasonic anemometers. Some embodiments include a method that may include transmitting a first acoustic signal from a first acoustic transmitter. At least a first portion of the first acoustic signal from the first acoustic transmitter may be hindered from being received at a first acoustic receiver. At least a second portion of the first acoustic signal from the first acoustic transmitter may be received at the first acoustic receiver along an acoustic propagation path. In some embodiments, the first acoustic transmitter may include a wide-beam transmitter. Some embodiments may utilize four wide-beam transducers positioned at apices of a tetrahedron.

30 Claims, 19 Drawing Sheets

(56) References Cited

U.S. PATENT DOCUMENTS

| | | | |
|---|---|---|---|
| 5,343,744 | A | 9/1994 | Ammann |
| 5,373,736 | A | 12/1994 | Brown |
| 5,650,571 | A | 7/1997 | Freud |
| 5,907,099 | A | 5/1999 | Huang |
| 6,216,544 | B1 | 4/2001 | Adachi |
| 6,244,114 | B1 | 6/2001 | Kowal |
| 6,606,916 | B2 | 8/2003 | Bignell |
| 6,856,273 | B1 * | 2/2005 | Bognar ............... G01F 1/66 |
| | | | 342/26 D |
| 9,874,842 | B2 * | 1/2018 | Ishida ............ G03G 15/5029 |
| 2002/0124662 | A1 | 9/2002 | Suzuki |
| 2015/0082913 | A1 | 3/2015 | Maruyama |
| 2015/0154432 | A1 | 6/2015 | Abedi |
| 2017/0003176 | A1 * | 1/2017 | Phan Le ............ G01S 15/885 |
| 2017/0018830 | A1 | 1/2017 | Henry |
| 2019/0128713 | A1 | 5/2019 | Campbell |

OTHER PUBLICATIONS

"ATMOS 41 Manual," METER Group, Inc., Copyright 2018, available at http://library.metergroup.com/Manuals/20635_ATMOS41_Manual_Web.pdf.

"METER to deliver automatic weather stations for continent-wide TAHMO network," METER Group, Inc., Jan. 26, 2017, available at https://www.metergroup.com/news/environment/meter-to-deliver-tahmo-weather-stations/.

"UltraSonic Anemometer," METER Group, Inc., Copyright 2017-2019, available at https://www.metergroup.com/environment/products/atmos-22-sonic-anemometer/.

"All-in-one weather station," METER Group, Inc., Copyright 2017-2019, available at https://www.metergroup.com/environment/products/atmos-41-weather-station/.

International Search Report and Written Opinion, International Appl. No. PCT/US2018/028503, dated Jun. 26, 2018, ISA—US.

* cited by examiner

ACOUSTIC STRUCTURAL REFLECTION INTERFERENCE MITIGATION SYSTEMS, METHODS, AND DEVICES

CROSS-REFERENCES TO RELATED APPLICATIONS

This application is a non-provisional patent application claiming priority benefit of U.S. provisional patent application Ser. No. 62/487,876, filed on Apr. 20, 2017 and entitled "COMPACT THREE-DIMENSIONAL ULTRASONIC ANEMOMETER WITH STRUCTURAL REFLECTION INTERFERENCE MITIGATION," and U.S. provisional patent application Ser. No. 62/614,407, filed on Jan. 6, 2018 and entitled "ACOUSTIC STRUCTURAL REFLECTION INTERFERENCE MITIGATION SYSTEMS, METHODS, AND DEVICES," the entire disclosures of which are herein incorporated by reference for all purposes.

BACKGROUND

A variety of different tools and techniques may be utilized for measurement of fluid flow speed and/or flow direction. For example, ultrasonic anemometers may be utilized to determine wind speed and/or wind direction.

There may be a need for new tools and techniques that may allow for the reduction in size of different systems and/or devices for such measurements and/or others.

SUMMARY

Methods, systems, and devices for acoustic structural reflection interference mitigation are provided in accordance with various embodiments. For example, some embodiments may provide for structural reflection interference mitigation for compact three-dimensional ultrasonic anemometers.

For example, some embodiments include a method that may include transmitting a first acoustic signal from a first acoustic transmitter. At least a first portion of the first acoustic signal from the first acoustic transmitter may be hindered from being received at a first acoustic receiver. At least a second portion of the first acoustic signal from the first acoustic transmitter may be received at the first acoustic receiver along an acoustic propagation path. In some embodiments, the acoustic propagation path between the first acoustic transmitter and the first acoustic receiver is less than or equal to 150 mm and the first acoustic transmitter includes a wide-beam transmitter.

In some embodiments, hindering at least the first portion of the first acoustic signal from the first acoustic transmitter includes scattering at least a portion of the first portion of the first acoustic signal off one or more physical projections coupled with a portion of one or more support structures, which may couple the first acoustic transmitter with the first acoustic receiver. In some embodiments, hindering at least the first portion of the first acoustic signal from the first acoustic transmitter includes reflecting at least a portion of the first portion of the first acoustic signal off a portion of one or more support structures, which may couple the first acoustic transmitter with the first acoustic receiver; the portion of the one or more support structures may be at least angled or oriented such that the portion of the first portion of the first acoustic signal is reflected away from the first acoustic receiver.

Some embodiments of the method include receiving at least a third portion of the first acoustic signal from the first acoustic transmitter at a second acoustic receiver. In some embodiments, the first acoustic receiver receives the second portion of the first acoustic signal from the first acoustic transmitter simultaneously to when the second acoustic receiver receives the third portion of the first acoustic signal from the first acoustic transmitter.

In some embodiments, a first transducer includes the first acoustic transmitter and a second transducer includes the first acoustic receiver. Some embodiments further include: transmitting a second acoustic signal from the second transducer; hindering at least a first portion of the second acoustic signal from the second transducer from being received at the first transducer; and/or receiving at least a second portion of the second acoustic signal from the second transducer at the first transducer along the acoustic propagation path. Some embodiments include determining a time of flight based on the second received portion of the first acoustic signal and a time of flight based on the second received portion of the second acoustic signal. Some embodiments include determining at least a speed of sound or a wind speed utilizing the time of flight based on the second received portion of the first acoustic signal and the time of flight based on the second received portion of the second acoustic signal. Some embodiments include determining an air temperature based on the determined speed of sound.

Some embodiments include utilizing the first transducer, the second transducer, a third transducer, and a fourth transducer at respective apices of a tetrahedron. In some embodiments, the one or more transducers include wide-beam transducers.

Some embodiments include determining at least: a time of flight based on the second received portion of the first acoustic signal from the first transducer received at the second transducer and a time of flight based on the second received portion of the second acoustic signal transmitted from the second transducer received at the first transducer; a time of flight based on a third received portion of the first acoustic signal from the first transducer received at the third transducer and a time of flight based on a first received portion of a third acoustic signal from the third transducer received at the first transducer; a time of flight based on a third received portion of the second acoustic signal from the second transducer received at the fourth transducer and a time of flight based on a first received portion of a fourth acoustic signal from the fourth transducer received at the second transducer; or a time of flight based on a second received portion of the third acoustic signal from the third transducer received at the fourth transducer and a time of flight based on a second received portion of a fourth acoustic signal from the fourth transducer received at the third transducer. Some embodiments include determining at least a wind velocity, a wind speed, or a wind direction utilizing at least three of the following: the time of flight based on the second received portion of the first acoustic signal from the first transducer received at the second transducer and the time of flight based on the second received portion of the second acoustic signal transmitted from the second transducer received at the first transducer; the time of flight based on the third received portion of the first acoustic signal from the first transducer received at the third transducer and the time of flight based on the first received portion of the third acoustic signal from the third transducer received at the first transducer; the time of flight based on a third received portion of the second acoustic signal from the second transducer received at the fourth transducer and the time of flight based on a first received portion of the fourth acoustic signal from the fourth transducer received at the second transducer; and/or the time of flight based on the second received portion of the third acoustic signal from the third transducer received at the fourth transducer and the time of flight based on the second received portion of the fourth acoustic signal from the fourth transducer received at the third transducer.

In some embodiments, the first transducer, the second transducer, the third transducer, and the fourth transducer transmit in a cycle with the order of transmission involving the following sequence of transducers: the first transducer; the fourth transducer; the second transducer; and the third transducer. In some embodiments, a separation (or acoustic propagation path distance) between the one or more transducers is less than or equal to 150 mm, 100 mm, 50 mm, or 35 mm.

Some embodiments include a system that may include: a first acoustic transmitter; a first acoustic receiver where the first acoustic receiver is positioned within an acoustic propagation path of the first acoustic transmitter; one or more support structures configured to couple the first acoustic transmitter with the first acoustic receiver; and/or one or more structural interference mitigators positioned to hinder a portion of a transmitted acoustic signal from the first acoustic transmitter from reaching the first acoustic receiver; for example, the one or more structural interference mitigators may be positioned so that they are not in the direct acoustic propagation path between the first acoustic transmitter and the first acoustic receiver. In some embodiments, the first acoustic transmitter and the first acoustic receiver are positioned such that the acoustic propagation path between the first acoustic transmitter and the first acoustic receiver is less than or equal to 150 mm and the first acoustic transmitter includes a wide-beam transmitter.

In some embodiments, the one or more structural interference mitigators include one or more projections from the one or more support structures. In some embodiments, the one or more structural interference mitigators include at least an oriented or an angled portion of the one or more support structures.

In some embodiments, a first transducer includes the first acoustic transmitter and a second transducer includes the first acoustic receiver. In some embodiments, the first transducer is positioned within an acoustic propagation path of the second transducer and one or more of the structural interference mitigators are configured to hinder a portion of a transmitted acoustic signal from the second transducer from reaching the first transducer. Similarly, the second transducer may be positioned within an acoustic propagation path of the first transducer and one or more of the structural interference mitigators may be configured to hinder a portion of a transmitted acoustic signal from the first transducer from reaching the second transducer.

Some embodiments include a processor configured to determine at least a speed or sound or a wind speed based on an acoustic signal transmitted from the first transducer to the second transducer along the first acoustic propagation path and an acoustic signal transmitted from the second transducer to the first transducer along a second acoustic propagation path; the first acoustic propagation path and the second acoustic propagation path are in effect the same path, but in opposite directions. In some embodiments, the processor is further configured to determine an air temperature based on a determined speed of sound.

Some embodiments include a third transducer and a fourth transducer. The first transducer, the second transducer, the third transducer, and the fourth transducer may be positioned at respective apices of a tetrahedron. In some embodiments, the first transducer, the second transducer, the third transducer, and the fourth transducer are configured as wide-beam transducers. In some embodiments, at least a portion of the one or more support structures is positioned outside a tetrahedral configuration formed by the first transducer, the second transducer, the third transducer, and the fourth transducer. In some embodiments, at least a portion of the one or more support structures is positioned inside a tetrahedral configuration formed by the first transducer, the second transducer, the third transducer, and the fourth transducer.

Some embodiments include a processor configured to determine at least: a time of flight based on the second received portion of the first acoustic signal from the first transducer received at the second transducer and a time of flight based on the second received portion of the second acoustic signal transmitted from the second transducer received at the first transducer; a time of flight based on a third received portion of the first acoustic signal from the first transducer received at the third transducer and a time of flight based on a first received portion of a third acoustic signal from the third transducer received at the first transducer; a time of flight based on a third received portion of the second acoustic signal from the second transducer received at the fourth transducer and a time of flight based on a first received portion of a fourth acoustic signal from the fourth transducer received at the second transducer; or a time of flight based on a second received portion of the third acoustic signal from the third transducer received at the fourth transducer and a time of flight based on a second received portion of a fourth acoustic signal from the fourth transducer received at the third transducer. In some embodiments, the processor is further configured to determine at least a wind velocity, a wind direction, or a wind speed based on utilizing at least of three of the following: the time of flight based on the second received portion of the first acoustic signal from the first transducer received at the second transducer and the time of flight based on the second received portion of the second acoustic signal transmitted from the second transducer received at the first transducer; the time of flight based on the third received portion of the first acoustic signal from the first transducer received at the third transducer and the time of flight based on the first received portion of the third acoustic signal from the third transducer received at the first transducer; the time of flight based on a third received portion of the second acoustic signal from the second transducer received at the fourth transducer and the time of flight based on the first received portion of a fourth acoustic signal from the fourth transducer received at the second transducer; and/or the time of flight based on the second received portion of the third acoustic signal from the third transducer received at the fourth transducer and the time of flight based on a second received portion of the fourth acoustic signal from the fourth transducer received at the third transducer.

In some embodiments, the first transducer, the second transducer, the third transducer, and the fourth transducer transmit in a cycle with the order of transmission involving the following sequence of transducers: the first transducer; the fourth transducer; the second transducer; and the third transducer. In some embodiments, a separation (or acoustic propagation path distance) between the one or more transducers is less than or equal to 150 mm, 100 mm, 50 mm, or 35 mm.

Some embodiments include methods, systems, and/or devices as described in the specification and/or shown in the figures.

The foregoing has outlined rather broadly the features and technical advantages of embodiments according to the disclosure in order that the detailed description that follows may be better understood. Additional features and advantages will be described hereinafter. The conception and specific embodiments disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of different embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1A:
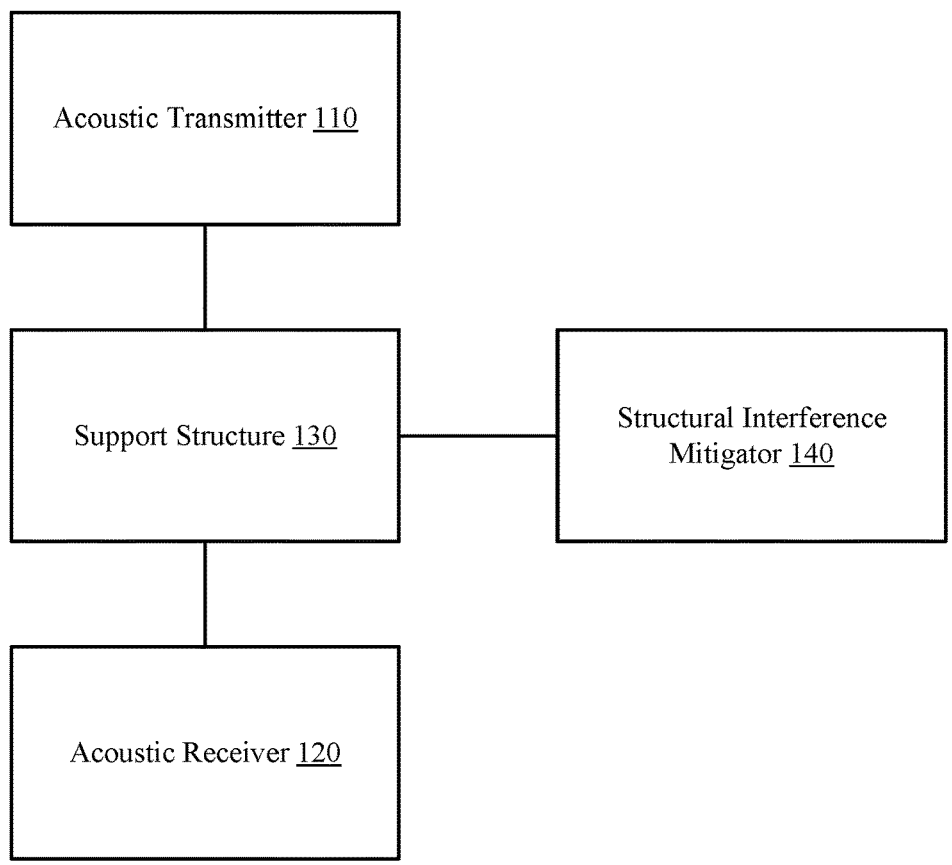
FIG. 1A shows a system in accordance with various embodiments.

This description provides embodiments, and is not intended to limit the scope, applicability, or configuration of the disclosure. Rather, the ensuing description will provide those skilled in the art with an enabling description for implementing embodiments of the disclosure. Various changes may be made in the function and arrangement of elements.

Thus, various embodiments may omit, substitute, or add various procedures or components as appropriate. For instance, it should be appreciated that the methods may be performed in an order different than that described, and that various stages may be added, omitted, or combined. Also, aspects and elements described with respect to certain embodiments may be combined in various other embodiments. It should also be appreciated that the following systems, devices, and methods may individually or collectively be components of a larger system, wherein other procedures may take precedence over or otherwise modify their application.

Methods, systems, and devices for acoustic structural reflection interference mitigation are provided in accordance with various embodiments. For example, some embodiments may provide for structural reflection interference mitigation for compact three-dimensional ultrasonic anemometers. Some embodiments may include tools and techniques that may allow components, such as transmitters and/or receivers (e.g., transducers), of fluid flow measurement systems and/or devices to be positioned closer together while maintaining data accuracy.

In general, real-time data showing wind direction and/or wind speed may support key decision-making, not only for weather science but also for manufacturing, military, safety, transportation, and other areas of interest. Acoustic anemometry generally uses ultrasonic waves to acquire immediate information about wind current velocity and direction without relying on moving parts subject to mechanical failure in adverse conditions.

Ultrasonic anemometers generally come within the class of current meters, measuring the passage of a fluid, such as water or air, through a gap between two acoustic transducers, for example. The characteristics of the fluid in the gap may cause detectable changes in the time of flight for sound waves across the gap. Mathematical algorithms may transform the detected changes into data outputs describing the motion of the fluid.

A receiving and transmitting transducer may detect these changes in one dimension. Additional transducers may allow detection in two and three dimensions. Three-dimensional detection may involve multiple transducers positioned to send or receive signals from one or more other transducers.

A physical support structure may hold the transducers in the proper position for sending and receiving acoustic waves. The support structure may hold the transducers from inside the acoustic pathways, or it may hold the transducers from outside the acoustic pathways, for example. Both types of support structures may challenge accurate data acquisition in two ways: structural flow interference and structural reflection interference.

Structural flow interference may occur when the fluid flow path coincides with some element of the physical structure. The problem of structural flow interference may be ameliorated by positioning bi-directional transducers at the apices of a tetrahedron, for example, which may allow for near-synchronous measurement of time of flight for sound across four noncoplanar pathways. With data reported from four pathways, computational analysis may identify and may discard the structurally perturbed data from the affected pathway, resulting in more accurate fluid-flow measurement.

Structural reflection interference may occur in some situations. For example, the wave of sound generated by transducers generally expands in a conical shape as it travels across a space; this may be typical for wide-beam transducers, for example. The expected receiving transducer may be positioned within this cone of sound, and the direct line between the sending and receiving transducer may constitute the acoustic propagation path along which time of flight may be calculated. Structural reflection interference errors may occur because the cone of sound emitted may be larger than the acoustic propagation path itself, which may be typical for wide-beam transmitters or wide-beam transducers. Some of the waves within the cone of sound, produced by the transmitting transducer, may bounce off one or more structural elements before arriving at a receiving transducer. This structural reflection interference may create false time-of-flight reports and thereby may degrade fluid-flow measurement accuracy; the waves that may cause structural reflection interference may follow what may be called acoustic interference paths. It may be noted that structural reflection interference may not be the same as errors arising from intermittent reflection and diffraction due to external environment conditions such as snow, sand, sea-spray, or the like. The use of low-frequency-emitting transducers may correct for external environment reflection and diffraction errors.

Existing three-dimensional acoustic flow detectors may overcome structural reflection interference by maximizing distance between acoustic propagation pathways and structural elements. Distance maximization, however, may result in bulky detectors exceeding 200 mm in length, height, and width, for example, and weighing more than 1,450 g, for example. Such bulky detectors may be functional for stationary applications in open sites but may be ill suited for mobile platforms or smaller spaces.

Many advantages may arise from a more compact (under 180 mm in all directions, though other sizes may be applicable) and light weight (50 to 500 g, for example, though other weights may be applicable) design. A compact and light device may enable operation on small autonomous vehicles, to reduce the cost and allow for disposability for parachute delivery of cargo in war zones, or to make the units inconspicuous when mounted in densely populated or mountainous areas, for example. Such compact and light devices may deliver near-instant wind speed and direction reporting in support of drone fleets making deliveries or performing reconnaissance operations, for example.

A structure that mounts transducers closer together may increase the likelihood of structural reflection interference. For example, a compact, lightweight ultrasonic anemometer for small and in-motion applications may involve another method in accordance with various embodiments for overcoming structural reflection interference.

Some embodiments overcome structural reflection interference through employing physical features to intentionally scatter structure-reflected sound waves away from receiving transducers, eliminating the source of the interference. These features and components may be integrated into the structure of the device, or in the case of extremely small devices, for example, integrated into the housing of the device itself, allowing for a more compact and lightweight three-dimensional ultrasonic anemometer than would otherwise be possible.

Some embodiments thus provide for structural reflection interference mitigation, which may allow transducers (or transmitters and receivers in general) to be positioned closer together while maintaining data accuracy; in some embodiments, the transducers include wide-beam transducers. This closer positioning may reduce the size of the support structure involved to produce three-dimensional fluid-flow measurements. For example, this may help reduce the bulk and weight of ultrasonic anemometers. The implementation may be used in a variety of transducer configurations where structural reflection interference may interfere with data acquisition accuracy.

Turning now to FIG. 1A, a system 100 is provided in accordance with various embodiments. System 100 may include an acoustic transmitter 110; an acoustic receiver 120 where the acoustic receiver 120 may be positioned within an acoustic propagation path of the acoustic transmitter 110; one or more support structures 130 configured to couple the acoustic transmitter 110 with the acoustic receiver 120; and/or one or more structural interference mitigators 140 positioned to hinder a portion of a transmitted acoustic signal from the acoustic transmitter 110 from reaching the acoustic receiver 120. Some embodiments may include multiple acoustic transmitters 110 and/or multiple acoustic receivers 120; some embodiments may utilize transducers, which may act as both acoustic transmitters 110 and acoustic receivers 120. In some embodiments, the acoustic transmitter 110 may be referred to as a first acoustic transmitter and/or the acoustic receiver 120 may be referred to as a first acoustic receiver. Some embodiments may include multiple support structures 130 and/or multiple structural interference mitigators 140. In some embodiments, the acoustic transmitter 110 may include a wide-beam transmitter.

In some embodiments of system 100, the one or more structural interference mitigators 140 include one or more projections from the one or more support structures 130. In some embodiments of system 100, the one or more structural interference mitigators 140 include at least an oriented or angled portion of the one or more support structures 130.

In some embodiments of system 100, a first transducer includes the first acoustic transmitter 110 and a second transducer includes the first acoustic receiver 120. In some embodiments, the first transducer is positioned within the acoustic propagation path of the second transducer and one or more of the structural interference mitigators 140 are configured to hinder a portion of a transmitted acoustic signal from the second transducer from reaching the first transducer. Some embodiments include a processor configured to determine at least a wind speed or a speed of sound based on an acoustic signal transmitted from the first transducer to the second transducer along the acoustic propagation path and an acoustic signal transmitted from the second transducer to the first transducer along the acoustic propagation path. In some embodiments, the processor is further configured to determine an air temperature based on a determined speed of sound.

Some embodiments of system 100 include a third transducer and a fourth transducer, which may be examples of acoustic transmitter 110 and/or acoustic receiver 120. The first transducer, the second transducer, the third transducer, and the fourth transducer may be positioned at respective apices of a tetrahedron. In some embodiments, one or more transducers include wide-beam transducers. In some embodiments, at least a portion of the one or more support structures is positioned outside a tetrahedral configuration formed by the first transducer, the second transducer, the third transducer, and the fourth transducer. In some embodiments, at least a portion of the one or more support structures is positioned inside a tetrahedral configuration formed by the first transducer, the second transducer, the third transducer, and the fourth transducer.

Some embodiments include a processor configured to determine at least: a time of flight based on the second received portion of the first acoustic signal from the first transducer received at the second transducer and a time of flight based on the second received portion of the second acoustic signal transmitted from the second transducer received at the first transducer; a time of flight based on a third received portion of the first acoustic signal from the first transducer received at the third transducer and a time of flight based on a first received portion of a third acoustic signal from the third transducer received at the first transducer; a time of flight based on a third received portion of the second acoustic signal from the second transducer received at the fourth transducer and a time of flight based on a first received portion of a fourth acoustic signal from the fourth transducer received at the second transducer; or a time of flight based on a second received portion of the third acoustic signal from the third transducer received at the fourth transducer and a time of flight based on a second received portion of a fourth acoustic signal from the fourth transducer received at the third transducer. In some embodiments, the processor is further configured to determine at least a wind velocity, a wind direction, or a wind speed based on utilizing at least three of the following: the time of flight based on the second received portion of the first acoustic signal from the first transducer received at the second transducer and the time of flight based on the second received portion of the second acoustic signal transmitted from the second transducer received at the first transducer; the time of flight based on the third received portion of the first acoustic signal from the first transducer received at the third transducer and the time of flight based on the first received portion of the third acoustic signal from the third transducer received at the first transducer; the time of flight based on a third received portion of the second acoustic signal from the second transducer received at the fourth transducer and the time of flight based on the first received portion of a fourth acoustic signal from the fourth transducer received at the second transducer; and/or the time of flight based on the second received portion of the third acoustic signal from the third transducer received at the fourth transducer and the time of flight based on a second received portion of the fourth acoustic signal from the fourth transducer received at the third transducer.

In some embodiments of system 100, the first transducer, the second transducer, the third transducer, and the fourth transducer transmit in a cycle with the order of transmission involving the following sequence of transducers: the first transducer; the fourth transducer, the second transducer; and the third transducer. Other cycles may be utilized, including, but not limited to the first transducer, the second transducer, the third transducer, and the fourth transducer.

In some embodiments, a separation (or acoustic propagation path distance) between the one or more transducers (or between acoustic transmitter 110 and acoustic receiver 120) is less than or equal to 150 mm, 100 mm, 50 mm, or 35 mm. Some embodiments may utilize a separation of approximately 35 mm (for example, between 30 mm and 40 mm). Some embodiments may utilize a separation of approximately 100 mm (for example, between 95 mm and 105 mm). Other separation distances may be utilized.

Figure 1B:
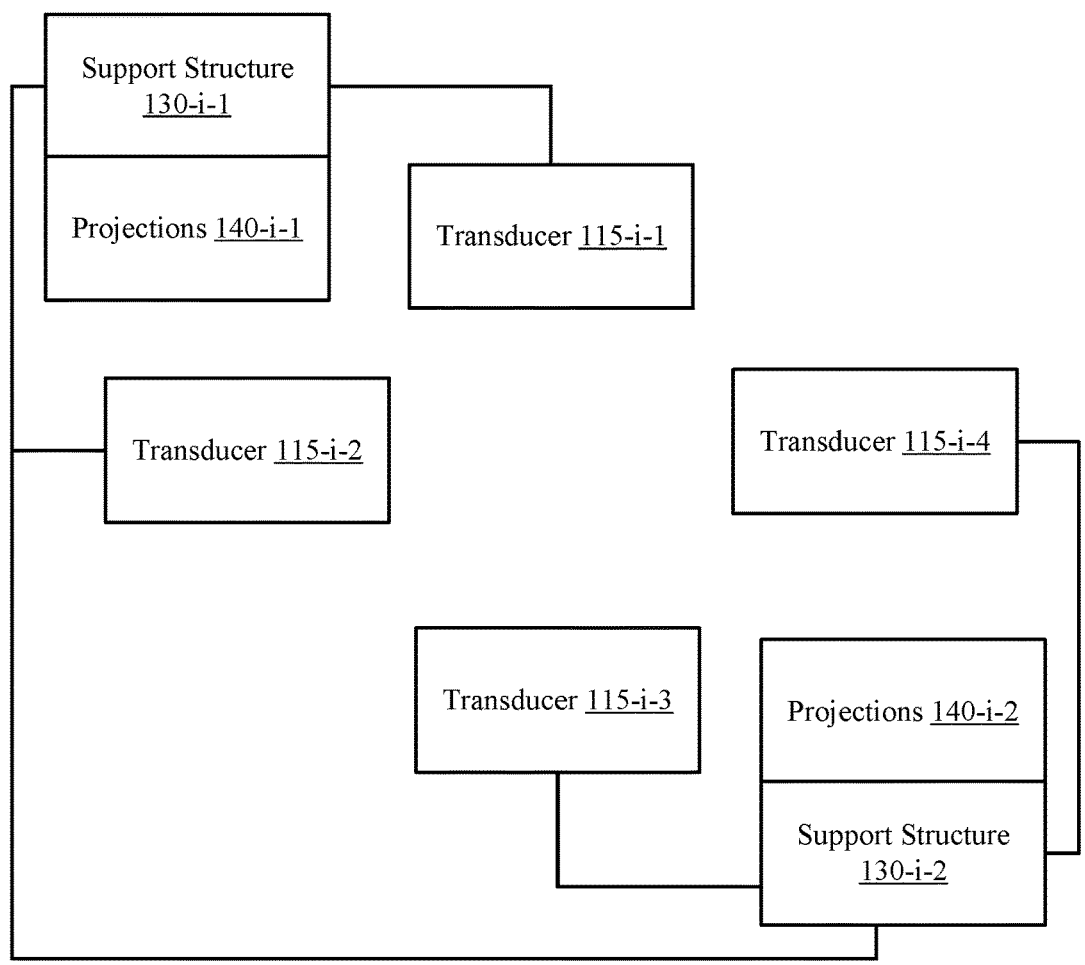
FIG. 1B shows a system in accordance with various embodiments.

FIG. 1B shows an example of a system 100-*a* in accordance with various embodiments. System 100-*a* may be an example of system 100. System 100-*a* may include multiple transducers 115-*i*-1, 115-*i*-2, 115-*i*-3, 115-*i*-4 which may be examples of acoustic transmitter 110 and/or acoustic receiver 120. While system 100-*a* shows an example with four transducers 115, other embodiments may include other numbers of transducers. Some embodiments may utilize separate acoustic transmitter 110 and acoustic receiver 120 in place of each transducer 115. In some embodiments, transducers 115-*i*-1, 115-*i*-2, 115-*i*-3, 115-*i*-4 include wide-beam transducers. System 100-*a* may include support structures 130-*i*-1, 130-*i*-2 and projections 140-*i*-1, 140-*i*-2; system 100-*a* may also include other support structures, such as multiple vertical support structures, for example. Transducers 115-*i*-3, 115-*i*-4 may be positioned within acoustic propagation paths of the transducers 115-*i*-1, 115-*i*-2; similarly, transducers 115-*i*-1, 115-*i*-2 may be positioned within acoustic propagation paths of the transducers 115-*i*-3, 115-*i*-4. Support structures 130-*i*-1, 130-*i*-2 may be configured to couple the transducers 115-*i*-1, 115-*i*-2, 115-*i*-3, 115-*i*-4 with each other. Projections 140-*i*-1, 140-*i*-2 may be positioned to hinder a portion of a transmitted acoustic signal from the transducers 115-*i*-1, 115-*i*-2 from reaching transducers 115-*i*-3, 115-*i*-4; similarly, projections 140-*i*-1, 140-*i*-2 may be positioned to hinder a portion of a transmitted acoustic signal from the transducers 115-*i*-3, 115-*i*-4 from reaching transducers 115-*i*-1, 115-*i*-2. Projections 140-*i*-1, 140-*i*-2 may act as structural interference mitigators and may be coupled with or integrated with the support structures 130-*i*-1, 130-*i*-2. In this embodiment, at least a portion of the one or more support structures 130-*i*-1, 130-*i*-2 are positioned outside a tetrahedral configuration formed by the one or more of the transducers 115-*i*-1, 115-*i*-2, 115-*i*-3, 115-*i*-4. In some embodiments, a portion of the one or more support structures 130-*i*-1, 130-*i*-2 are positioned inside a cone of sound of one or more of the transducers 115-*i*-1, 115-*i*-2, 115-*i*-3, 115-*i*-4. In some embodiments, a separation (or acoustic propagation path distance) between the one or more transducers 115-*i*-1, 115-*i*-2, 115-*i*-3, 115-*i*-4 is less than or equal to 150 mm, 100 mm, 50 mm, or 35 mm. Some embodiments may utilize a separation of approximately 35 mm (for example, between 30 mm and 40 mm). Other separation distances may be utilized.

For example, system 100-*a* may provide an embodiment that provides structural reflection interference mitigation where the one or more of the support structures 130-*i*-1, 130-*i*-2 may be positioned outside the perimeter of tetrahedral acoustic propagation paths. For example, system 100-*a* may be configured for reflection interference mitigation in an ultrasonic anemometer having a support structure outside the tetrahedral acoustic propagation paths, which may rely on physical projections, such as projections 140-*i*-1, 140-*i*-2 located on the surfaces of the support structures 130-*i*-1, 130-*i*-2 within the transmitted cone of sound to scatter, reflect, or otherwise hinder sound from being received at receiving transducers.

Merely by way of example, a transducer, such as transducers 115-*i*-1, 115-*i*-2, 115-*i*-3, 115-*i*-4, may transmit a burst of sound. The cone of sound may expand as it travels away from the transmitting transducer. Where the cone of sound contacts the central housing surfaces, the acoustic waves may be intercepted and diffracted, reflected, scattered, absorbed, or otherwise hindered by projections 140-

*i*-1, 140-*i*-2. The projections 140-*i*-1, 140-*i*-2 on the central housing surfaces or other support structures 130-*i*-1, 130-*i*-2 may be at a height and spacing that may interact with the acoustic wave to direct reflected sound away from receiving transducers. The height, spacing, shape, and/or density of the projections 140-*i*-1, 140-*i*-2 may vary based on different orientations of the sensors, the housing material, and the physical size of the unit.

Figure 1C:
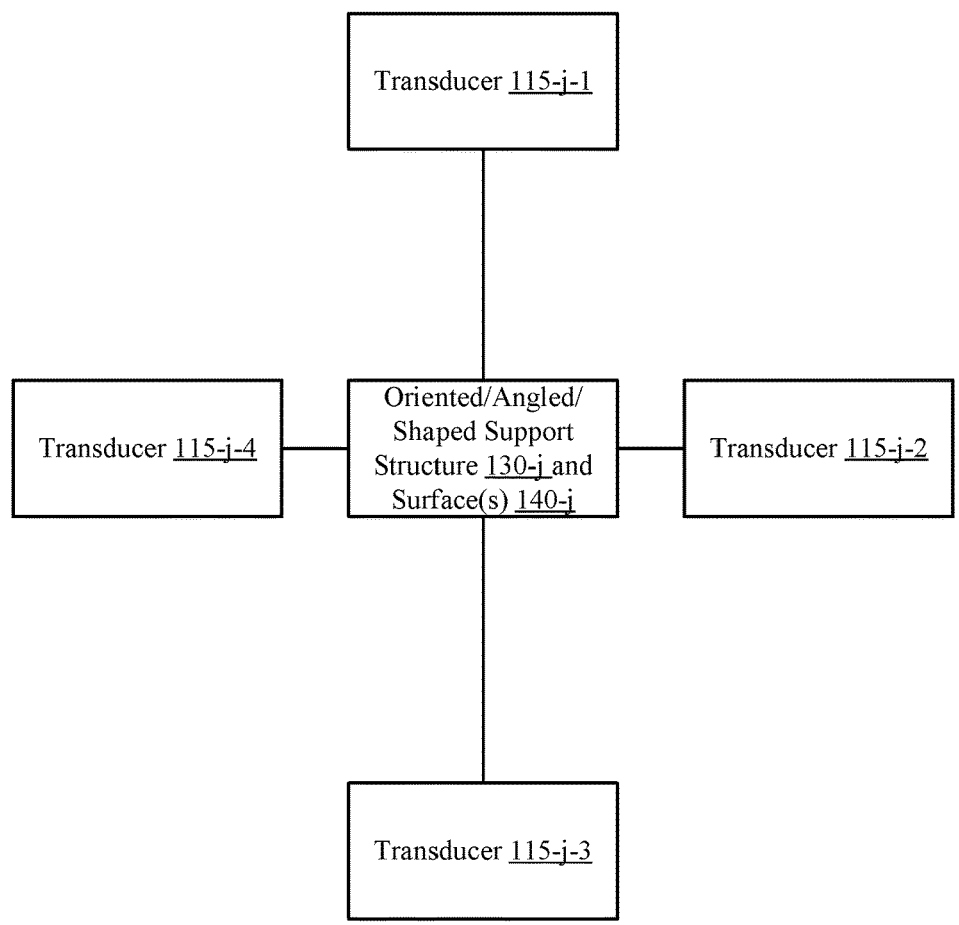
FIG. 1C shows a system in accordance with various embodiments.

FIG. 1C shows an example of a system 100-*b* in accordance with various embodiments. System 100-*b* may be an example of system 100. System 100-*b* may include multiple transducers 115-*j*-1, 115-*j*-2, 115-*j*-3, 115-*j*-4, which may be examples of acoustic transmitter 110 and/or acoustic receiver 120. While system 100-*b* shows an example with four transducers 115, other embodiments may include other numbers of transducers. Some embodiments may utilize a separate acoustic transmitter and acoustic receiver in place of each transducer 115. In some embodiments, the transducers 115-*j*-1, 115-*j*-2, 115-*j*-3, 115-*j*-4 include wide-beam transducers. System 100-*b* may include one or more support structures 130-*j*. Transducers 115-*j*-1, 115-*j*-2 may be positioned within an acoustic propagation path of the transducers 115-*j*-3, 115-*j*-4; similarly, transducers 115-*j*-3, 115-*j*-4 may be positioned within an acoustic propagation path of the transducers 115-*j*-1, 115-*j*-2. Support structure 130-*j* may be configured to couple the transducers 115-*j*-1, 115-*j*-2, 115-*j*-3, 115-*j*-4 with each other. Support structure 130-*j* may be oriented, angled, and/or shaped such that one or more surfaces 140-*j* are configured to hinder a portion of a transmitted acoustic signal from the one or more transducers 115-*j*-1, 115-*j*-2, 115-*j*-3, 115-*j*-4 from reaching one or more of the other transducers 115-*j*-1, 115-*j*-2, 115-*j*-3, 115-*j*-4. Support structure 130-*j* and/or its surfaces 140-*j* may act as structural interference mitigators. In this embodiment, at least a portion of support structure 130-*j* is positioned inside a tetrahedral configuration formed by one or more of the transducers 115-*j*-1, 115-*j*-2, 115-*j*-3, 115-*j*-4. In some embodiments, at least a portion of support structure 130-*j* may be positioned inside a cone of sound of one or more of the transducers 115-*j*-1, 115-*j*-2, 115-*j*-3, 115-*j*-4. In some embodiments, a separation (or acoustic propagation path distance) between the one or more transducers 115-*j*-1, 115-*j*-2, 115-*j*-3, 115-*j*-4 is less than or equal to 150 mm, 100 mm, 50 mm, or 35 mm. Some embodiments may utilize a separation of approximately 100 mm (for example, between 95 mm and 105 mm). Other separation distances may be utilized.

For example, system 100-*b* may provide for structural reflection interference mitigation where vertical support structure 130-*j* may exist inside the perimeter of tetrahedral acoustic propagation paths. System 100-*b* may provide for structural reflection interference mitigation as an ultrasonic anemometer having support structure 130-*j* inside the tetrahedral acoustic propagation paths, which may rely on one or more blocking surfaces 140-*j* angled, shaped, and/or oriented relative to the cone of sound such that sound is reflected away from receiving transducers.

Merely by way of example, a transducer, such as transducers 115-*j*-1, 115-*j*-2, 115-*j*-3, 115-*j*-4, may transmit a burst of sound. The cone of sound may expand as it travels away from the transmitting transducer. Where the cone of sound contacts the central support post 130-*j* and/or one or more of its surfaces 140-*j*, the acoustic waves may be intercepted and reflected by the surface 140-*j* positioned at an angle, an orientation, and/or with a shape that directs undesirable reflections away from receiving transducers. The angle, size, orientation, and/or location of the central support post 130-*j* may depend on varying orientations of the sensors, the housing material, and the physical size of the unit.

Figure 1D:
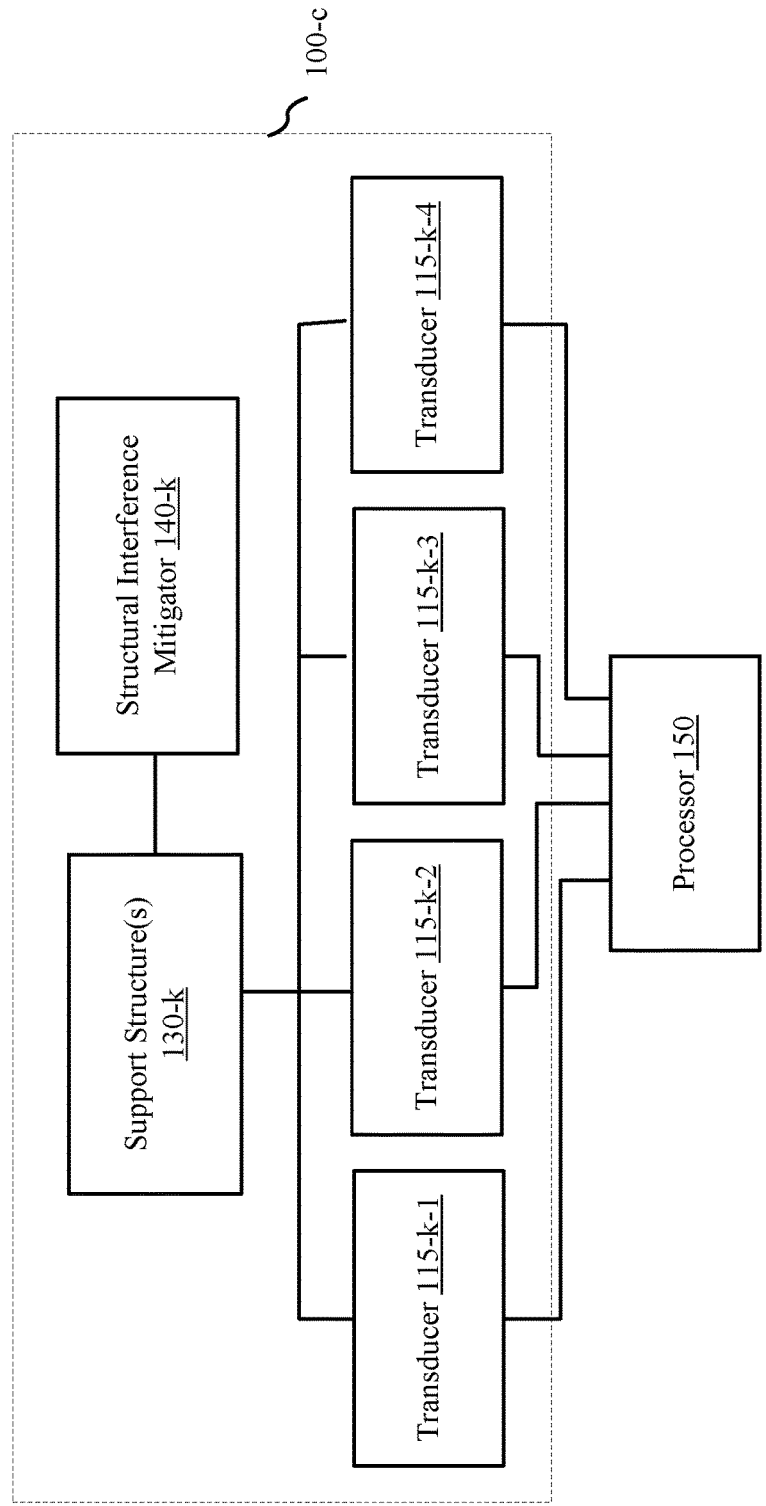
FIG. 1D shows a system in accordance with various embodiments.

FIG. 1D shows an example of a system 101, which may include a system 100-*c* and a processor 150, in accordance with various embodiments. System 100-*c* may be an example of system 100 of FIG. 1A, system 100-*a* of FIG. 1B, and/or system 100-*b* of FIG. 1C. Processor 150 may be coupled with transducers 115-*k*-1, 115-*k*-2, 115-*k*-3, 115-*k*-4. System 100-*c* may also include one or more support structures 130-*k* and one or more structural interference mitigators 140-*k*; these components may be coupled with each other or integrated into each other to provide unitary components, such as a support structures that may be utilized to provide for structural interference mitigation. In some embodiments, the transducers 115-*k*-1, 115-*k*-2, 115-*k*-3, 115-*k*-4 include wide-beam transducers.

Processor 150 may be configured to receive signals from transducers 115-*k*-1, 115-*k*-2, 115-*k*-3, 115-*k*-4 that may be utilized to determine information such as time of flight, speed of sound, wind speed, wind direction, wind velocity, and/or temperature, for example.

For example, some embodiments include determining a time of flight based on the second received portion of the first acoustic signal and a time of flight based on the second received portion of the second acoustic signal utilizing processor 150. Some embodiments include determining a speed of sound and/or a wind speed utilizing the time of flight based on the second received portion of the first acoustic signal and the time of flight based on the second received portion of the second acoustic signal utilizing processor 150. Some embodiments include determining an air temperature based on the determined speed of sound utilizing processor 150.

Merely by way of example, the speed of sound C may be determined from the time of flight T1, T2 measured in both directions along an acoustic propagation path between two of the transducers and the distance L between the two transducers:

$$C = \frac{L}{2}\left\{\frac{1}{T1} + \frac{1}{T2}\right\}.$$

Similarly, a wind speed V may be determined with similar information:

$$V = \frac{L}{2}\left\{\frac{1}{T1} - \frac{1}{T2}\right\}.$$

Through determining at least three wind speeds between 3 pairs of two transducers, one may reconstruction a total wind speed and direction or a wind velocity.

Temperature may also be determined from the measured speed of sound. For example, with the measured speed of sound, temperature may be calculated utilizing several constants, such as y (the adiabatic index), R (the molar gas constant), and M (the molecular weight of air):

$$\text{Temperature} = \frac{\{C^\wedge 2 * M\}}{\gamma * R}.$$

Humidity and air pressure may affect these measurements and may only provide approximate equations in some cases. Other equations may be utilized to determine temperature.

Some embodiments may utilize processor 150 for determining at least: a time of flight based on the second received portion of the first acoustic signal from the first transducer 115-k-1 received at the second transducer 115-k-2 and a time of flight based on the second received portion of the second acoustic signal transmitted from the second transducer 115-k-2 received at the first transducer 115-k-1; a time of flight based on a third received portion of the first acoustic signal from the first transducer 115-k-1 received at the third transducer 115-k-3 and a time of flight based on a first received portion of a third acoustic signal from the third transducer 115-k-3 received at the first transducer 115-k-1; a time of flight based on a third received portion of the second acoustic signal from the second transducer 115-k-2 received at the fourth transducer 115-k-4 and a time of flight based on a first received portion of a fourth acoustic signal from the fourth transducer 115-k-4 received at the second transducer 115-k-2; or a time of flight based on a second received portion of the third acoustic signal from the third transducer 115-k-3 received at the fourth transducer 115-k-4 and a time of flight based on a second received portion of a fourth acoustic signal from the fourth transducer 115-k-4 received at the third transducer 115-k-3. Some embodiments may utilize processor 150 for determining at least a wind velocity, a wind speed, or a wind direction utilizing at least three of the following: the time of flight based on the second received portion of the first acoustic signal from the first transducer 115-k-1 received at the second transducer 115-k-2 and the time of flight based on the second received portion of the second acoustic signal transmitted from the second transducer 115-k-2 received at the first transducer 115-k-1; the time of flight based on the third received portion of the first acoustic signal from the first transducer 115-k-1 received at the third transducer 115-k-3 and the time of flight based on the first received portion of the third acoustic signal from the third transducer 115-k-3 received at the first transducer 115-k-1; the time of flight based on a third received portion of the second acoustic signal from the second transducer 115-k-2 received at the fourth transducer 115-k-4 and the time of flight based on a first received portion of the fourth acoustic signal from the fourth transducer 115-k-4 received at the second transducer 115-k-2; and/or the time of flight based on the second received portion of the third acoustic signal from the third transducer 115-k-3 received at the fourth transducer 115-k-4 and the time of flight based on the second received portion of the fourth acoustic signal from the fourth transducer 115-k-4 received at the third transducer 115-k-3.

In some embodiments, processor 150 is configured to determine a wind speed and/or a speed of sound based on an acoustic signal transmitted from the first transducer 115-k-1 to the second transducer 115-k-2 along an acoustic propagation path between the first transducer 115-k-1 to the second transducer 115-k-2 and an acoustic signal transmitted from the second transducer 115-k-2 to the first transducer 115-k-1 along the acoustic propagation path the second transducer 115-k-2 to the first transducer 115-k-1. In some embodiments, the processor 150 is further configured to determine an air temperature based on a determined speed of sound.

Figure 2A:
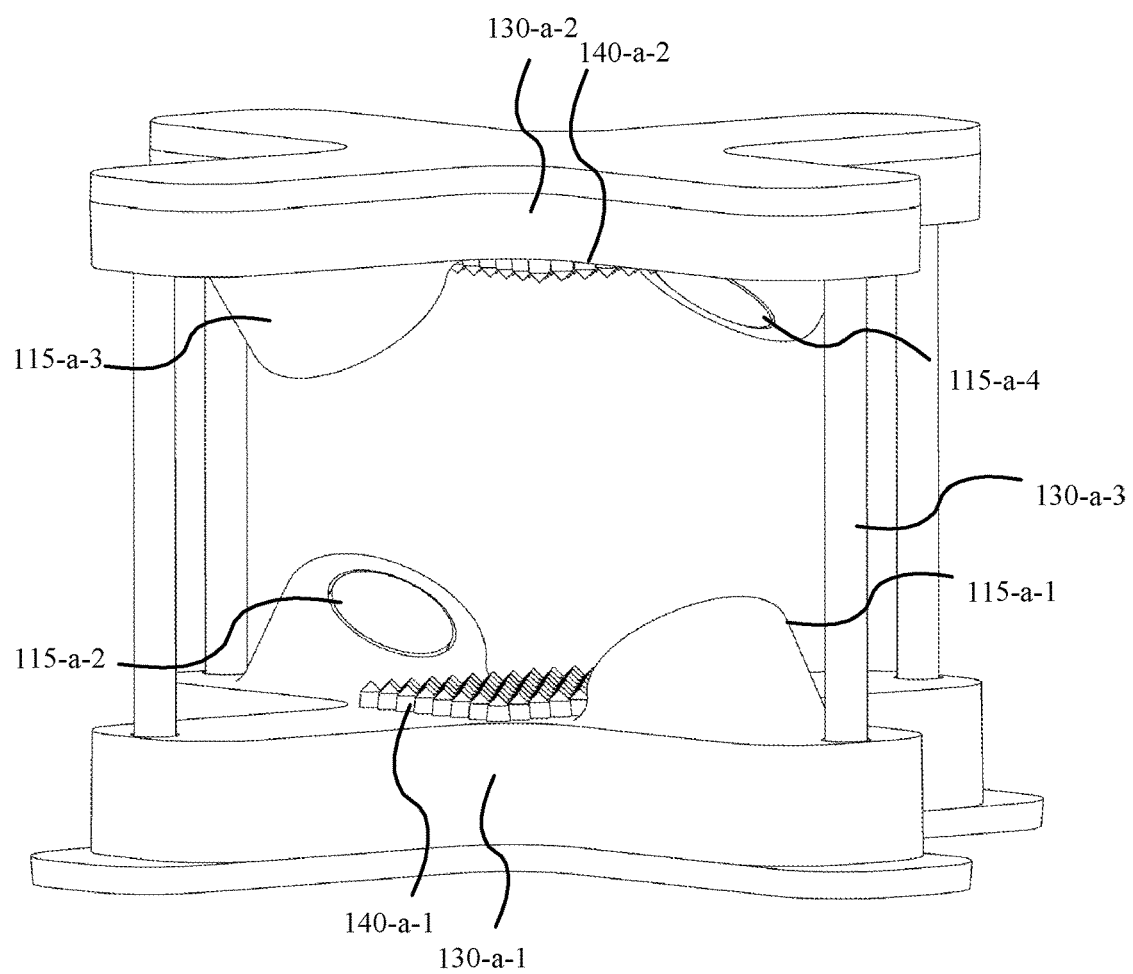
FIG. 2A shows a system in accordance with various embodiments.

Turning now to FIG. 2A, a system 200 is shown in accordance with various embodiments. System 200 may be an example of system 100 of FIG. 1A, system 100-a of FIG. 1B, and/or system 100-c of FIG. 1D. System 200 may include multiple transducers 115-a-1, 115-a-2, 115-a-3, 115-a-4, which may be examples of acoustic transmitter 110 and/or acoustic receiver 120 of FIG. 1A, for example. While system 200 shows an example with four transducers 115, other embodiments may include other numbers of transducers. Some embodiments may utilize a separate acoustic transmitter and acoustic receiver in place of each transducer 115. In some embodiments, the transducers 115-a-1, 115-a-2, 115-a-3, 115-a-4 include wide-beam transducers. System 200 may include support structures 130-a-1, 130-a-2 and projections 140-a-1, 140-a-2; system 200 may include other support structures, such as vertical support structure 130-a-3. Transducers 115-a-3, 115-a-4 may be positioned within an acoustic propagation path of the transducers 115-a-1, 115-a-2; similarly, transducers 115-a-1, 115-a-2 may be positioned within an acoustic propagation path of the transducers 115-a-3, 115-a-4. Support structures 130-a-1, 130-a-2, 130-a-3 may be configured to couple the transducers 115-a-1, 115-a-2, 115-a-3, 115-a-4 with each other. Projections 140-a-1, 140-a-2 may be positioned to hinder a portion of a transmitted acoustic signal from the transducers 115-a-1, 115-a-2 from reaching transducers 115-a-3, 115-a-4; similarly, projections 140-a-1, 140-a-2 may be positioned to hinder a portion of a transmitted acoustic signal from the transducers 115-a-3, 115-a-4 from reaching by transducers 115-a-1, 115-a-2. Projections 140-a-1, 140-a-2 may act as structural interference mitigators and may be coupled with or integrated with the support structures 130-a-1, 130-a-2. In this embodiment, at least a portion of the one or more support structures 130-a-1, 130-a-2, 130-a-3 are positioned outside a tetrahedral configuration formed by the one or more of the transducers 115-a-1, 115-a-2, 115-a-3, 115-a-4 In some embodiments, at least a portion of the one or more support structures 130-a-1, 130-a-2, 130-a-3 are positioned inside a cone of sound of one or more of the transducers 115-a-1, 115-a-2, 115-a-3, 115-a-4.

One may note that the reference lines for transducers 115-a-2 and 115-a-4 may connect with the faces of two of the four transducers, which emit acoustic waves. The other two faces of transducers 115-a-1 and 115-a-3 may not be visible in the figure but are housed in transducer housings, which the reference line for these transducers 115-a-1 and 115-a-3 may connect with in this figure. Although the system shows the use of four transducers 115-a-1, 115-a-2, 115-a-3, 115-a-4, each which may operate as an emitter and receiver by turns, an alternative arrangement of paired separate emitting and receiving probes, such as separate transmitters and receivers, may also be used. In some embodiments, transducer 115-a-1 may be referred to as a first transducer, transducer 115-a-2 may be referred to as a fourth transducer, transducer 115-a-3 may be referred to as a second transducer, and/or transducer 115-a-4 may be referred to as a third transducer.

Merely by way of example, some embodiments include configuring transducers 115-a-1, 115-a-2, 115-a-3, 115-a-4 such that a distance between a face of transducer 115-a-1 and a face of transducer 115-a-4 (or a face of transducer 115-a-3) or between a face of transducer 115-a-2 and the face of transducer 115-a-4 (or the face of transducer 115-a-3) may be less than or equal to 150 mm. Some embodiments may utilize a distance of approximately 35 mm (for example, between 30 mm and 40 mm). The distances between transducers may also be referred to as acoustic propagation path distances. Other transducer separation distances may be utilized.

System 200 may provide an embodiment that provides structural reflection interference mitigation where the one or more of the support structures 130-*a*-1, 130-*a*-2 may be positioned outside the perimeter of tetrahedral acoustic propagation paths. For example, system 200 may be configured for reflection interference mitigation in an ultrasonic anemometer having a support structure outside the tetrahedral acoustic propagation paths, which may rely on physical projections, such as projections 140-*a*-1, 140-*a*-2 located on the flat surfaces of the support structures 130-*a*-1, 130-*a*-2 within the transmitted cone of sound to scatter reflected or otherwise hindered sound away from receiving transducers.

Figure 2B:
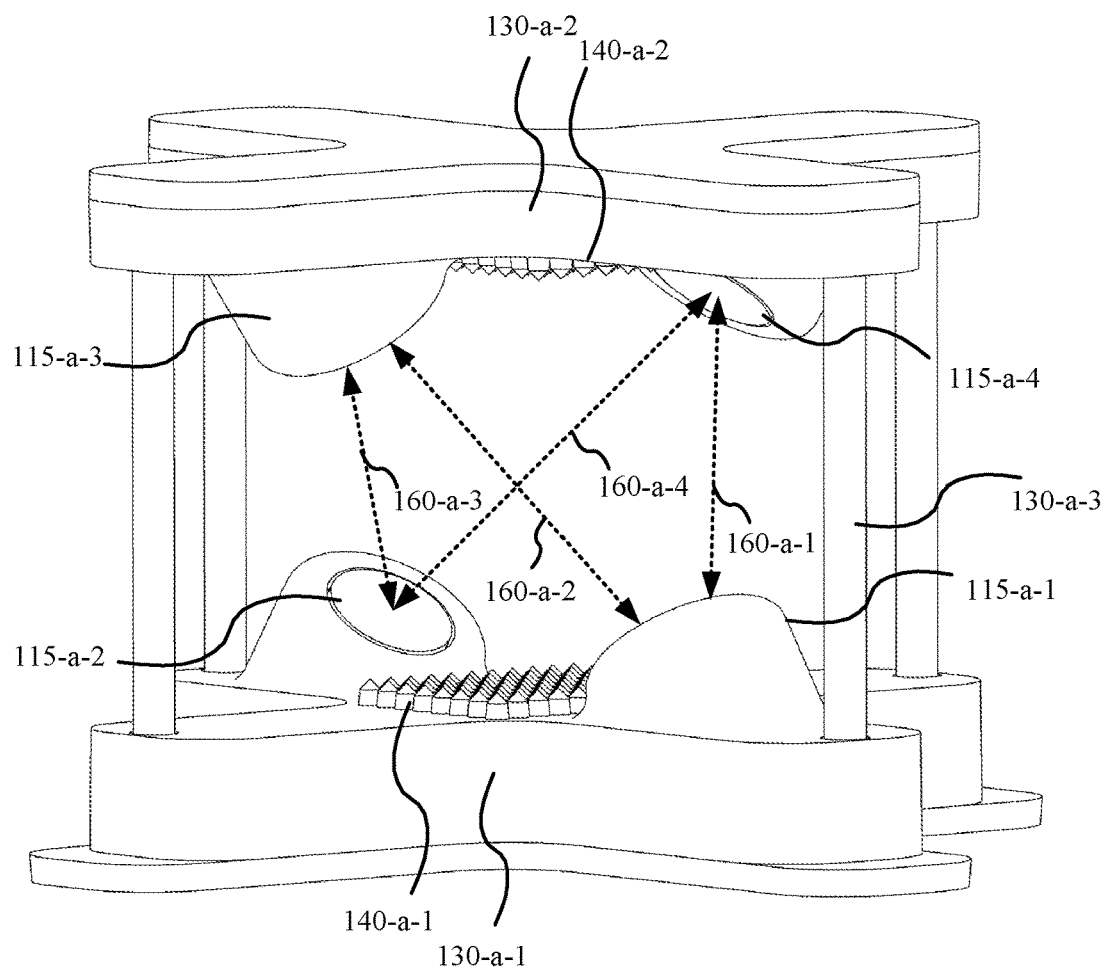
FIG. 2B shows a system in accordance with various embodiments.

FIG. 2B shows system 200 in accordance with various embodiments. For example, FIG. 2B may show multiple acoustic propagation paths 160-*a*-1, 160-*a*-2, 160-*a*-3, 160-*a*-4 between different combinations of transducers 115-*a*-1, 115-*a*-2, 115-*a*-3, 115-*a*-4. FIG. 2B may show clear line-of-sight acoustic propagation paths 160-*a*-1, 160-*a*-2, 160-*a*-3, 160-*a*-4 between different pairs of receiving and transmitting transducers 115-*a*-1, 115-*a*-2, 115-*a*-3, 115-*a*-4. Properties of these acoustic propagation paths 160-*a*-1, 160-*a*-2, 160-*a*-3, 160-*a*-4 may allow for the identification of the characteristics of the fluid flow between the respective pairs of transducers. These acoustic propagation paths 160-*a*-1, 160-*a*-2, 160-*a*-3, 160-*a*-4 may form four edges of a tetrahedral pattern or configuration. Portions of support structures 130-*a*-1, 130-*a*-2 and/or other housing components may form the other two edges of the tetrahedral pattern or configuration. A variety of different sizes of tetrahedral pattern or configuration may be utilized in accordance with various embodiments.

In general, the multiple acoustic propagation paths 160-*a*-1, 160-*a*-2, 160-*a*-3, 160-*a*-4 may represent portions of acoustic signals transmitted from one or more of the transducers 115-*a*-1, 115-*a*-2, 115-*a*-3, 115-*a*-4 and/or received at one or more of the transducers 115-*a*-1, 115-*a*-2, 115-*a*-3, 115-*a*-4. For example, acoustic propagation path 160-*a*-4 may represent a second portion of a first acoustic signal transmitted from transducer 115-*a*-2 and received at transducer 115-*a*-4. Similarly, acoustic propagation path 160-*a*-4 may represent a second portion of a first acoustic signal transmitted from transducer 115-*a*-4 and received at transducer 115-*a*-2. Acoustic propagation path 160-*a*-3 may represent a third portion of the first acoustic signal transmitted from transducer 115-*a*-2 and received at transducer 115-*a*-3. In some embodiments, transducer 115-*a*-4 receives the second portion of the first acoustic signal transmitted from transducer 115-*a*-2 approximately simultaneously to when the transducer 115-*a*-3 receives the third portion of the first acoustic signal transmitted from transducer 115-*a*-2; this may be a result of the acoustic propagation paths 160-*a*-3 and 160-*a*-4 being configured to be the same length.

Figure 2C:
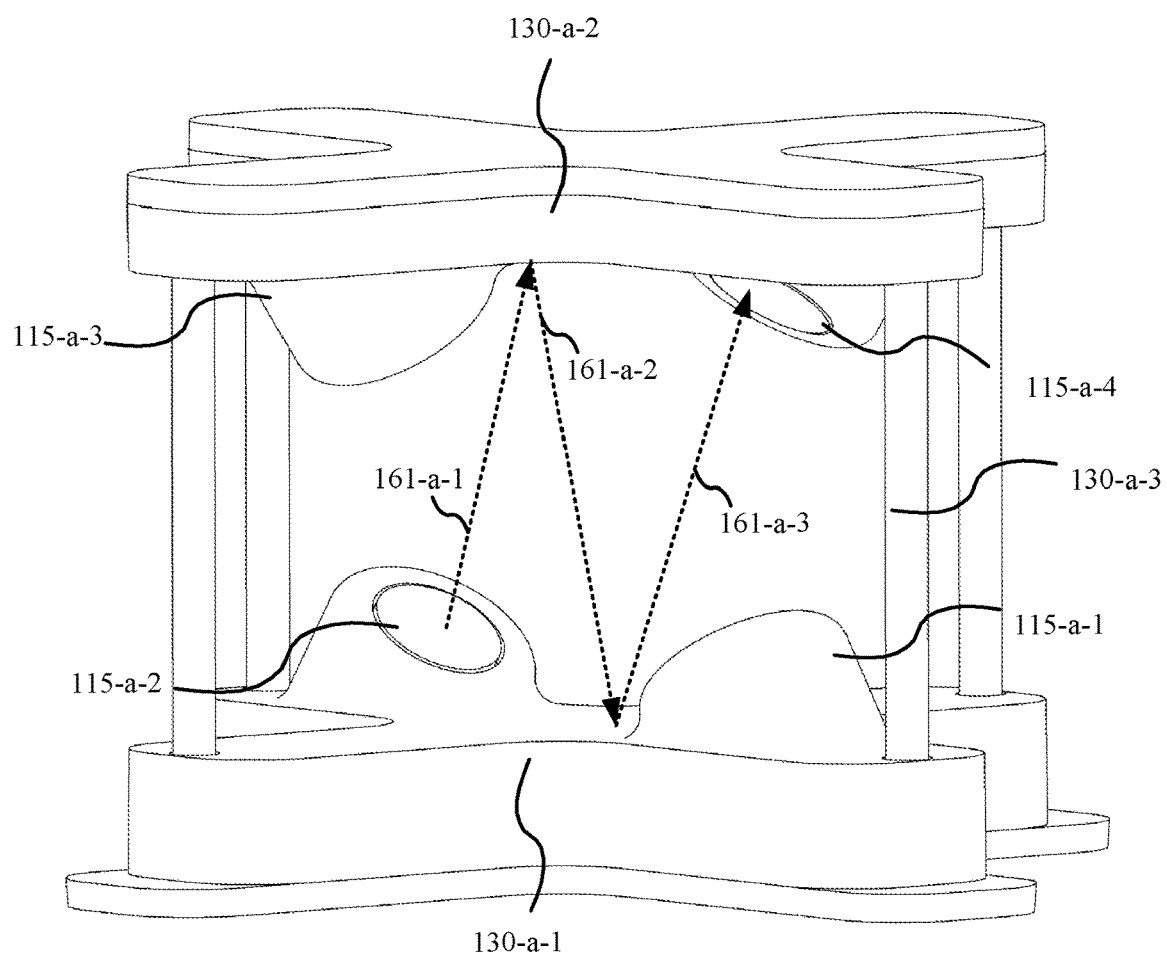
FIG. 2C shows aspects of a system.

FIG. 2C shows a system variation 201 with respect to system 200 that may face structural interference. In this example, system 201 may not have projections 140-*a*-1, 140-*a*-2 included. For example, FIG. 2C shows sound wave paths 161-*a*-1, 161-*a*-2, 161-*a*-3 as they may bounce or reflect off different portions of support structures 130-*a*-1, 130-*a*-2, which may include flat, smooth surfaces; these paths may be referred to as acoustic interference paths. Sound wave path 161-*a*-1 may be in the emitted cone of sound of transducer 115-*a*-2 and, through one or more reflections, may end up being received by transducer 115-*a*-4. Reflected sound such as shown may cause erroneous time-of-flight calculation and may throw off calculated speed of sound. Other possible sound reflections may occur within system 201 that could cause erroneous time-of-flight calculations, though not necessarily shown.

Figure 2D:
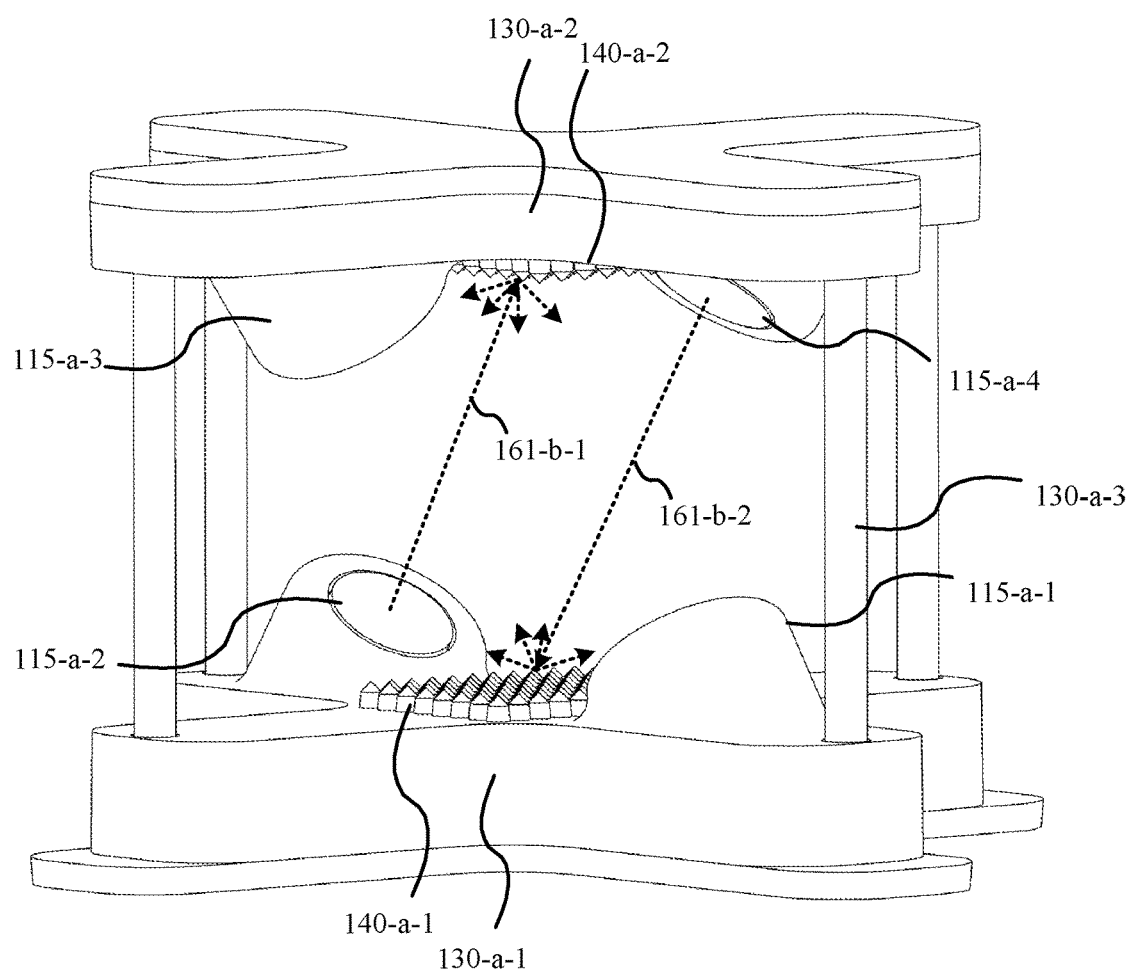
FIG. 2D shows a system in accordance with various embodiments.
Figure 2E:
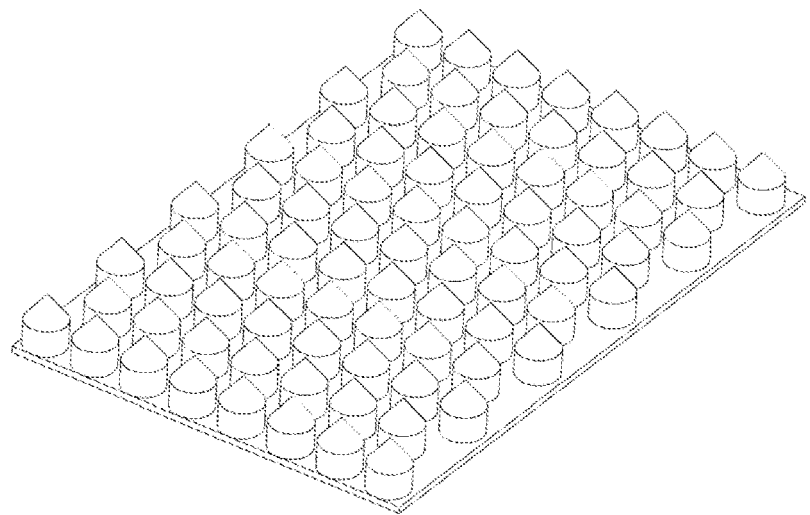
FIG. 2E shows a device or aspects of a system in accordance with various embodiments.

FIG. 2D shows system 200 in accordance with various embodiments. For example, FIG. 2D may show sound wave paths 161-*b*-1, 161-*b*-2, within the emitted cone of sound of transducers 115-*a*-2, 115-*a*-4, respectively; paths 161-*b*-1, 161-*b*-2 may be referred to as acoustic interference paths. FIG. 2D shows that sound waves, rather than reflecting off flat surfaces of support structures 130-*a*-1, 130-*a*-2, may scatter off projections 140-*a*-1, 140-*a*-2, or otherwise be hindered (e.g., absorbed, dampened, diffracted) from being received as reflected sound off support structures 130-*a*-1, 130-*a*-2 to the other transducers, such as 115-*a*-1, 115-*a*-3.

As noted above with respect to FIG. 2B, transducer 115-*a*-2 may transmit an acoustic signal, which may be referred to as a first acoustic signal transmitted from transducer 115-*a*-2. Path 161-*b*-1 may represent a portion of the first acoustic signal transmitted from transducer 115-*a*-2; in some embodiments, this portion of the first acoustic signal transmitted from transducer 115-*a*-2 may be referred to as a first portion of the first acoustic signal transmitted from the transducer 115-*a*-2; as shown in FIG. 2D, this first portion of the first acoustic signal transmitted from transducer 115-*a*-2 may be hindered from being received at one or more of the transducers, such as transducer 115-*a*-4, through being scattered, for example, by projections 140-*a*-2. Similarly, transducer 115-*a*-4 may transmit an acoustic signal, which may be referred to as a second acoustic signal transmitted from transducer 115-*a*-4. Path 161-*b*-2 may represent a portion of the second acoustic signal transmitted from transducer 115-*a*-4; in some embodiments, this portion of the second acoustic signal transmitted from transducer 115-*a*-4 may be referred to as a first portion of the second acoustic signal transmitted from the transducer 115-*a*-4; as shown in FIG. 2D, this first portion of the second acoustic signal transmitted from transducer 115-*a*-4 may be hindered from being received at one or more of the transducers, such as transducer 115-*a*-2, through being scattered, for example, by projections 140-*a*-1.

Figure 2F:
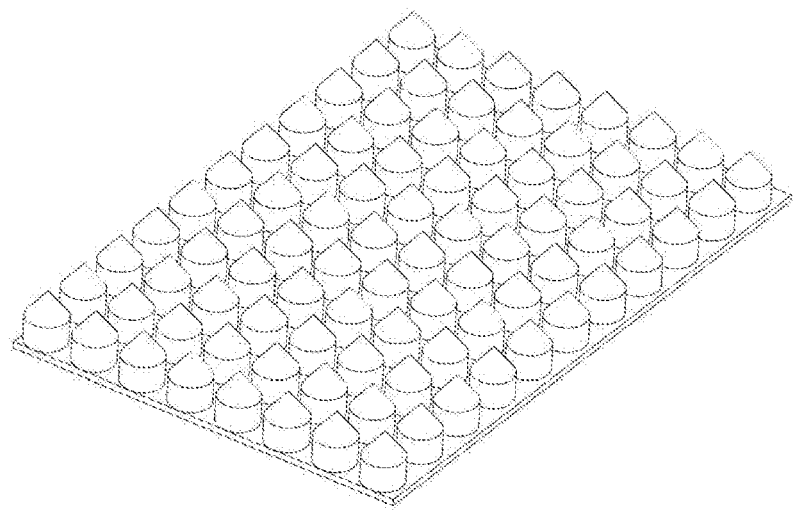
FIG. 2F shows a device or aspects of a system in accordance with various embodiments.
Figure 2G:
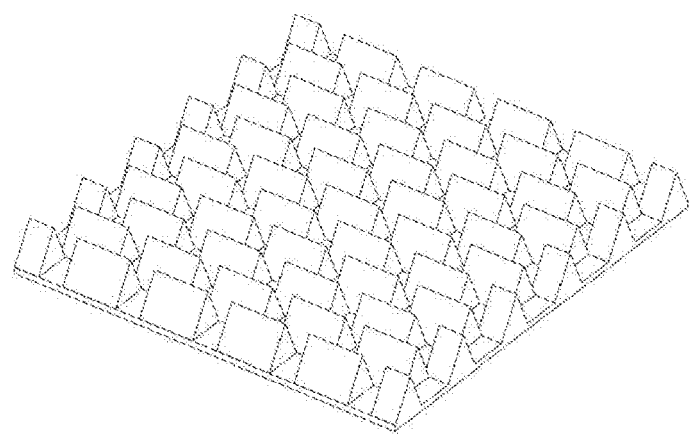
FIG. 2G shows a device or aspects of a system in accordance with various embodiments.
Figure 2H:
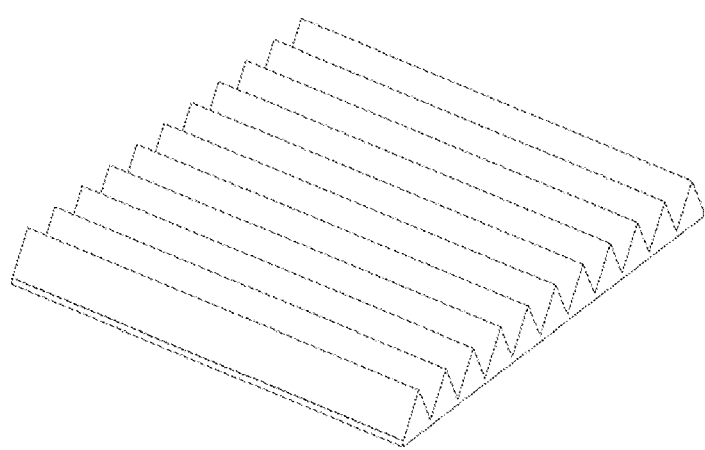
FIG. 2H shows a device or aspects of a system in accordance with various embodiments.

Turning next to FIG. 2E, FIG. 2F, FIG. 2G, and FIG. 2H, examples of different projections 140-*b*-1, 140-*b*-2, 140-*b*-3, and 140-*b*-4 are shown in accordance with various embodiments. Projections 140-*b*-1, 140-*b*-2, 140-*b*-3, and 140-*b*-4 may provide different geometrical shapes or surfaces that may scatter, absorb, dampen, change the angle of reflection, and/or otherwise hinder sound in order to mitigate the errors introduced by sound striking a portion of a system, such as portion of a support structure 130 of FIG. 1A, FIG. 1B, FIG. 1C, FIG. 1D, FIG. 2A, FIG. 2B, FIG. 2C, and/or FIG. 2D, and bouncing, reflecting, or otherwise being received into a wrong transducer. The angles and/or features contained in the different projections 140-*b*-1, 140-*b*-2, 140-*b*-3, and 140-*b*-4 may be designed to ensure that a substantial portion of the emitted sounds striking the different projections 140-*b*-1, 140-*b*-2, 140-*b*-3, and 140-*b*-4 may be deflected or otherwise interfered or hindered to direct the wave away from the undesired receiving transducer. Numerous variants of such features may be utilized as shown in these figures, though other geometries may be used to provide the intended function. Merely by way of example, FIG. 2E may show projections 140-*b*-1 configured as staggered, cylindrical, cone-topped projections. FIG. 2F may show projections 140-*b*-2 configured as uniformly-spaced, cylindrical, cone-topped projections. FIG. 2G may show projections 140-*b*-3 configured as triangular section projections. FIG. 2H may show projections 140-*b*-4 configured as rows of elongated triangular section projections.

Figure 3A:
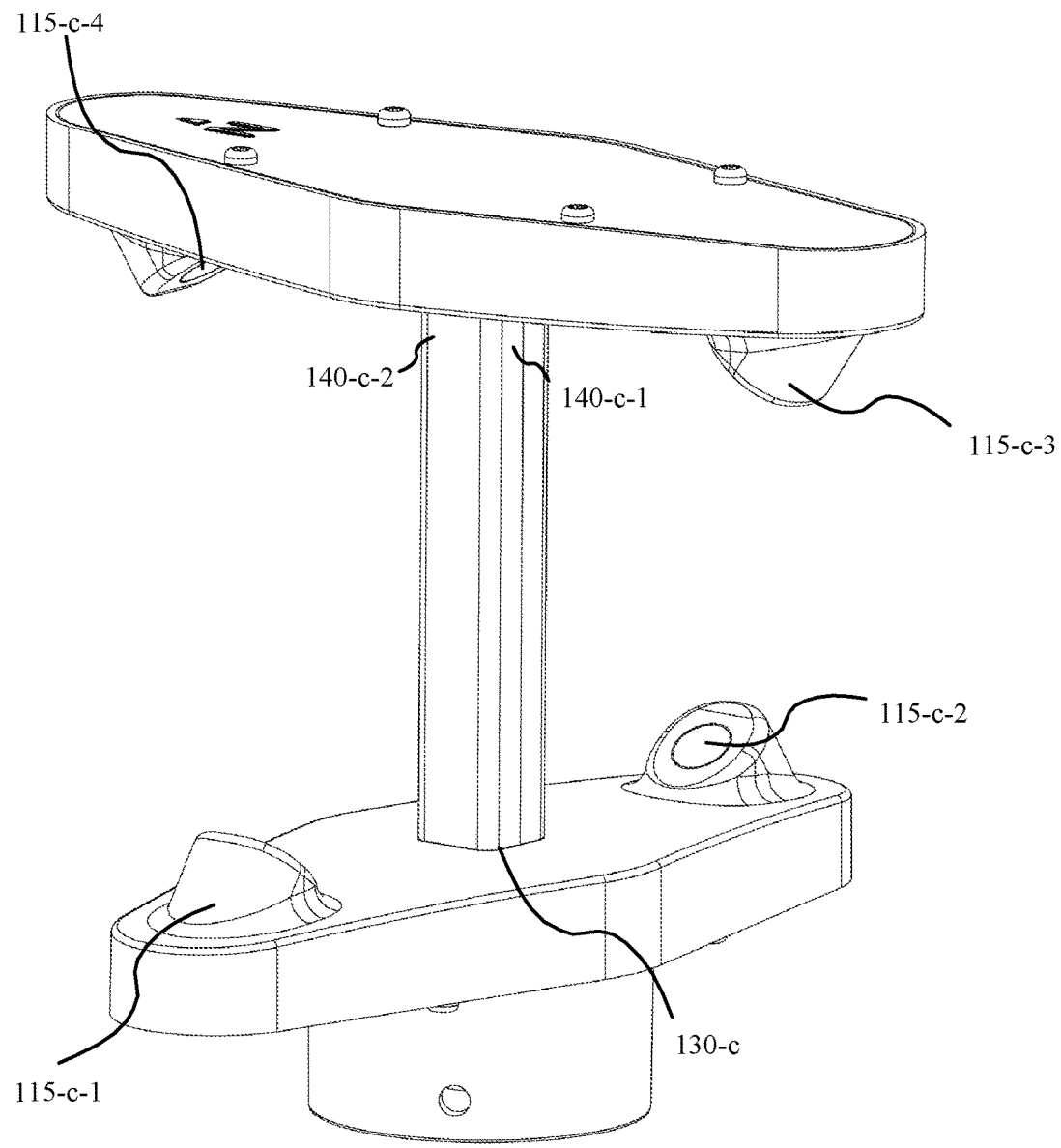
FIG. 3A shows a system in accordance with various embodiments.

Turning now to FIG. 3A, a system 300 is shown in accordance with various embodiments. System 300 may be an example of system 100 of FIG. 1A, system 100-*b* of FIG. 1C, and/or system 100-*c* of FIG. 1D. System 300 may include multiple transducers 115-*c*-1, 115-*c*-2, 115-*c*-3, 115-*c*-4, which may be examples of acoustic transmitter 110 and/or acoustic receiver 120. While system 300 shows an example with four transducers 115, other embodiments may include other numbers of transducers. Some embodiments may utilize separate acoustic transmitter and acoustic receiver in place of each transducer 115. In some embodiments, the transducers 115-*c*-1, 115-*c*-2, 115-*c*-3, 115-*c*-4 include wide-beam transducers. System 300 may include support structure 130-*c*. Transducers 115-*c*-1, 115-*c*-2 may be positioned within an acoustic propagation path of the transducers 115-*c*-3, 115-*c*-4; similarly, transducers 115-*c*-3, 115-*c*-4 may be positioned within an acoustic propagation path of the transducers 115-*c*-1, 115-*c*-2. Support structure 130-*c* may be configured to couple the transducers 115-*c*-1, 115-*c*-2, 115-*c*-3, 115-*c*-4 with each other. Support structure 130-*c* may be oriented, angled, and/or shaped such that one or more surfaces 140-*c*-1, 140-*c*-2, for example, may be configured to hinder a portion of a transmitted acoustic signal from the one or more transducers 115-*c*-1, 115-*c*-2, 115-*c*-3, 115-*c*-4 from reaching one or more of the other transducers 115-*c*-1, 115-*c*-2, 115-*c*-3, 115-*c*-4. Support structure 130-*c* and/or its surfaces 140-*c*-1, 140-*c*-2 may act as structural interference mitigators. In this embodiment, at least a portion of support structure 130-*c* is positioned inside a tetrahedral configuration formed by the one or more transducers 115-*c*-1, 115-*c*-2, 115-*c*-3, 115-*c*-4. and inside a cone of sound of the one or more transducers 115-*c*-1, 115-*c*-2, 115-*c*-3, 115-*c*-4.

For example, system 300 may provide for structural reflection interference mitigation where vertical support structure 130-*c* may exist inside the perimeter of tetrahedral acoustic propagation paths. System 300 may provide for structural reflection interference mitigation as an ultrasonic anemometer having support structure 130-*c* inside the tetrahedral acoustic propagation paths, which may rely on one or more blocking surfaces 140-*c*-1, 140-*c*-2 being oriented relative to the cone of sound such that sound is reflected away from receiving transducers.

One may note that the reference lines for transducers 115-*c*-2 and 115-*c*-4 may connect with the faces of two of the four transducers, which emit acoustic waves. The other two faces of transducers 115-*c*-1 and 115-*c*-3 may not be visible in the figure but are housed in transducer housings, which the reference line for these transducers 115-*c*-1 and 115-*c*-3 may connect with in this figure. Furthermore, two surfaces of support structure 130-*c* may not be visible in the figure. Although the system shows the use of four transducers 115-*c*-1, 115-*c*-2, 115-*c*-3, 115-*c*-4, each which may operate as an emitter and receiver by turns, an alternative arrangement of paired separate emitting and receiving probes, such as separate transmitters and receivers, may also be used. In some embodiments, transducer 115-*c*-1 may be referred to as a first transducer, transducer 115-*c*-2 may be referred to as a fourth transducer, transducer 115-*c*-3 may be referred to as a second transducer, and/or transducer 115-*c*-4 may be referred to as a third transducer.

Merely by way of example, some embodiments include configuring transducers 115-*c*-1, 115-*c*-2, 115-*c*-3, 115-*c*-4 such that a distance between a face of transducer 115-*c*-1 and a face of transducer 115-*c*-4 (or a face of transducer 115-*c*-3) or between a face of transducer 115-*c*-2 and the face of transducer 115-*c*-4 (or the face of transducer 115-*c*-3) may be less than or equal to 150 mm. Some embodiments may utilize a distance of approximately 100 mm (for example, between 95 mm and 105 mm). These distances between transducers may also be referred to as acoustic propagation path distances. Other transducer separation distances may be utilized.

Figure 3B:
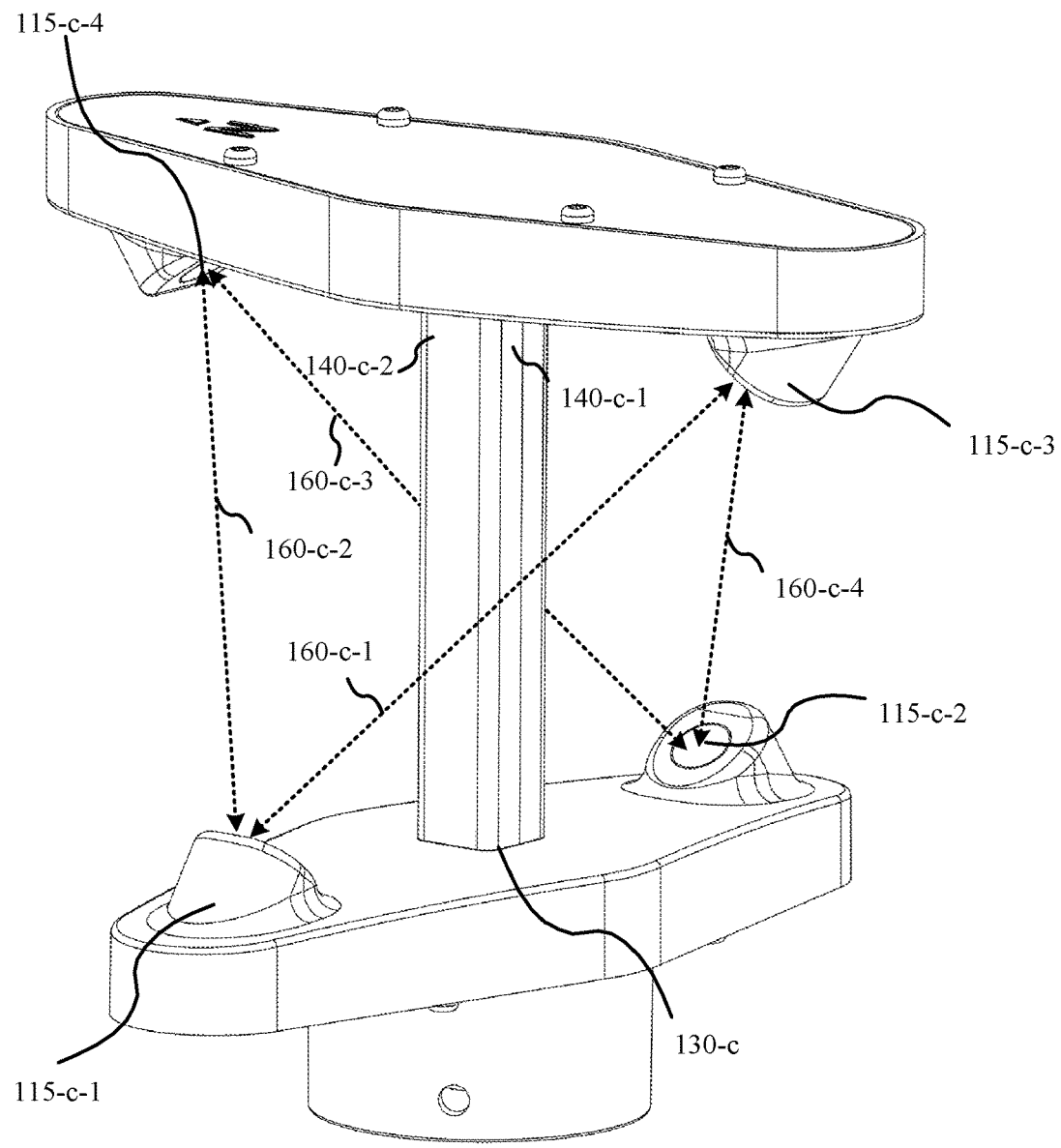
FIG. 3B shows a system in accordance with various embodiments.

FIG. 3B shows system 300 in accordance with various embodiments. For example, FIG. 3B may show multiple acoustic propagation paths 160-*c*-1, 160-*c*-2, 160-*c*-3, 160-*c*-4 between different combinations of transducers 115-*c*-1, 115-*c*-2, 115-*c*-3, 115-*c*-4. FIG. 3B may show clear line-of-sight acoustic propagation paths 160-*c*-1, 160-*c*-2, 160-*c*-3, 160-*c*-4 between different pairs of receiving and transmitting transducers 115-*c*-1, 115-*c*-2, 115-*c*-3, 115-*c*-4. Properties of these acoustic propagation paths 160-*c*-1, 160-*c*-2, 160-*c*-3, 160-*c*-4 may allow for the identification of the characteristics of the fluid flow between the respective pairs of transducers. These acoustic propagation paths may form four edges of a tetrahedral pattern. A variety of different sizes of tetrahedral pattern may be utilized in accordance with various embodiments.

In general, the multiple acoustic propagation paths 160-*c*-1, 160-*c*-2, 160-*c*-3, 160-*c*-4 may represent portions of acoustic signals transmitted from one or more of the transducers 115-*c*-1, 115-*c*-2, 115-*c*-3, 115-*c*-4 and/or received at one or more of the transducers 115-*c*-1, 115-*c*-2, 115-*c*-3, 115-*c*-4. For example, acoustic propagation path 160-*c*-1 may represent a second portion of a first acoustic signal transmitted from transducer 115-*c*-1 and received at transducer 115-*c*-3. Similarly, acoustic propagation path 160-*c*-1 may represent a second portion of a first acoustic signal transmitted from transducer 115-*c*-3 and received at transducer 115-*c*-1. Acoustic propagation path 160-*c*-2 may present a third portion of the first acoustic signal transmitted from transducer 115-*c*-1 and received at transducer 115-*c*-4. In some embodiments, transducer 115-*c*-3 receives the second portion of the first acoustic signal transmitted from transducer 115-*c*-1 approximately simultaneously to when the transducer 115-*c*-4 receives the third portion of the first acoustic signal transmitted from transducer 115-*c*-1; this may be a result of the acoustic propagation paths 160-*c*-1 and 160-*c*-2 being configured to be the same length.

Figure 3C:
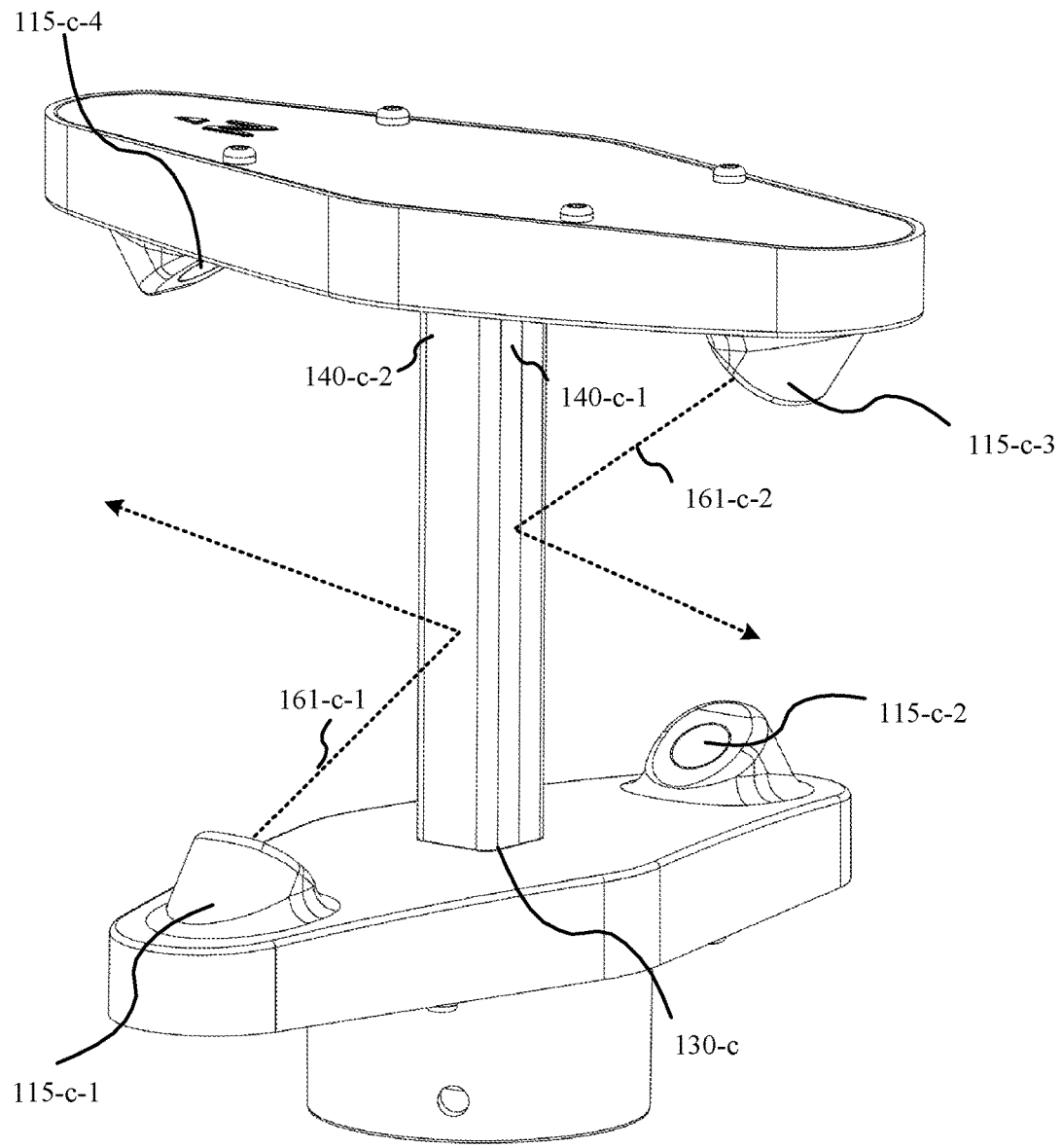
FIG. 3C shows a system in accordance with various embodiments.

FIG. 3C shows system 300 in accordance with various embodiments. For example, FIG. 3C may show sound wave paths 161-*c*-1, 161-*c*-2, within the emitted cone of sound of transducers 115-*c*-1, 115-*c*-3, respectively. FIG. 3C shows that sound waves, rather than reflecting off flat surfaces 140-*c*-2, 140-*c*-1 of support structures 130-*c* and being directed to other transducers such as 115-*c*-4, 115-*c*-2, for example, the sound waves are reflected away or otherwise hindered from being received as reflected sound off support structures 130-*c* to the other transducers, such as 115-*c*-4, 115-*c*-2. Flat surfaces 140-*c*-2, 140-*c*-1 may be oriented with respect to one or more of the transducers and/or to present a flat face to one or more of the transducers. Paths 161-*c*-1, 161-*c*-2 may be referred to as acoustic interference paths, though the oriented flat surfaces 140-*c*-2, 140-*c*-1 may mitigate the potential interference that the paths 161-*c*-1, 161-*c*-2 could have caused.

As noted above with respect to FIG. 3B, transducer 115-*c*-1 may transmit an acoustic signal, which may be referred to as a first acoustic signal transmitted from transducer 115-*c*-1. Path 161-*c*-1 may represent a portion of the first acoustic signal transmitted from transducer 115-*c*-1; in some embodiments, this portion of the first acoustic signal transmitted from transducer 115-*c*-1 may be referred to as a first portion of the first acoustic signal transmitted from the transducer 115-*c*-1; as shown in FIG. 3C, this first portion of the first acoustic signal transmitted from transducer 115-*c*-1 may be hindered from being received at one or more of the transducers, such as transducer 115-c-3, through being reflected away from these other transducers due to the orientation and/or angle of the surface 140-c-2 of support structure 130-c. Similarly, transducer 115-c-3 may transmit an acoustic signal, which may be referred to as a second acoustic signal transmitted from transducer 115-c-3. Path 161-c-2 may represent a portion of the second acoustic signal transmitted from transducer 115-c-3; in some embodiments, this portion of the second acoustic signal transmitted from transducer 115-c-3 may be referred to as a first portion of the second acoustic signal transmitted from the transducer 115-c-3; as shown in FIG. 3C, this first portion of the second acoustic signal transmitted from transducer 115-c-3 may be hindered from being received at one or more of the transducers, such as transducer 115-c-1, through being reflected away from these other transducers due to the orientation and/or angle of the surface 140-c-1 of support structure 130-c.

Figure 3D:
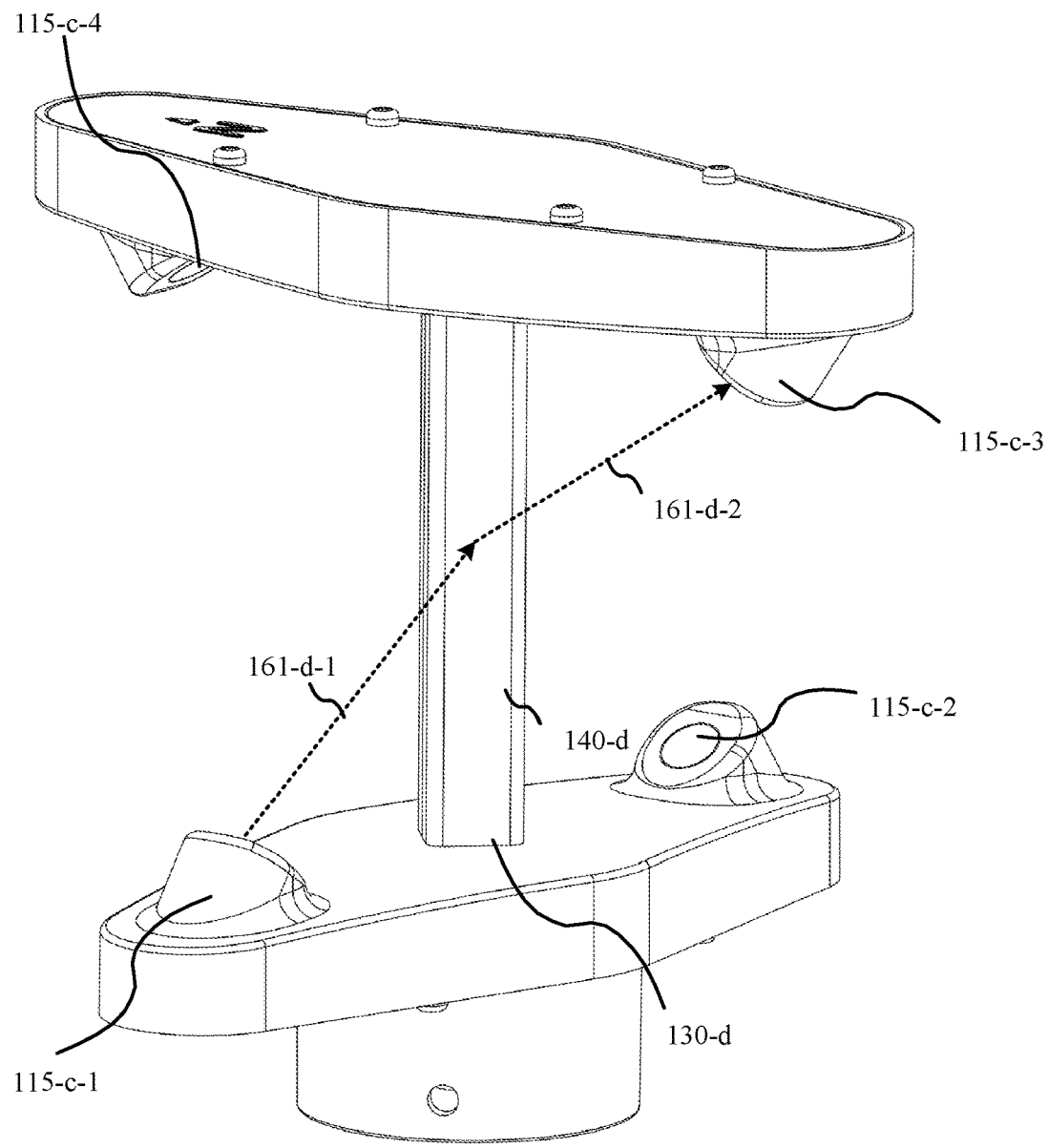
FIG. 3D shows aspects of a system.

In contrast, FIG. 3D shows a system variation 301 with respect to system 300 that may face structural interference due to the orientation of support structure 130-d; for example, support structure 130-d may be oriented to present its faces, such as surface 140-d, at a 45-degree angle with respect to one or more of the transducers. For example, FIG. 3D shows sound wave paths 161-d-1, 161-d-2 that may bounce or reflect off different portions of support structure 130-d, which may include flat smooth surfaces 140-d. Paths 161-d-1, 161-d-2 may be referred to as acoustic interference paths. Sound waves along path 161-d may be in the emitted cone of sound of transducer 115-c-1 and may be received after reflection at transducer 115-c-3. Reflected sound such as shown may cause erroneous time-of-flight calculation and may throw off calculated speed of sound. Other possible sound reflections may occur within system 301 that could cause erroneous time-of-flight calculations, though not necessarily shown. Other shaped support structures such as cylindrical support structures may cause similar problems in some cases.

Figure 3E:
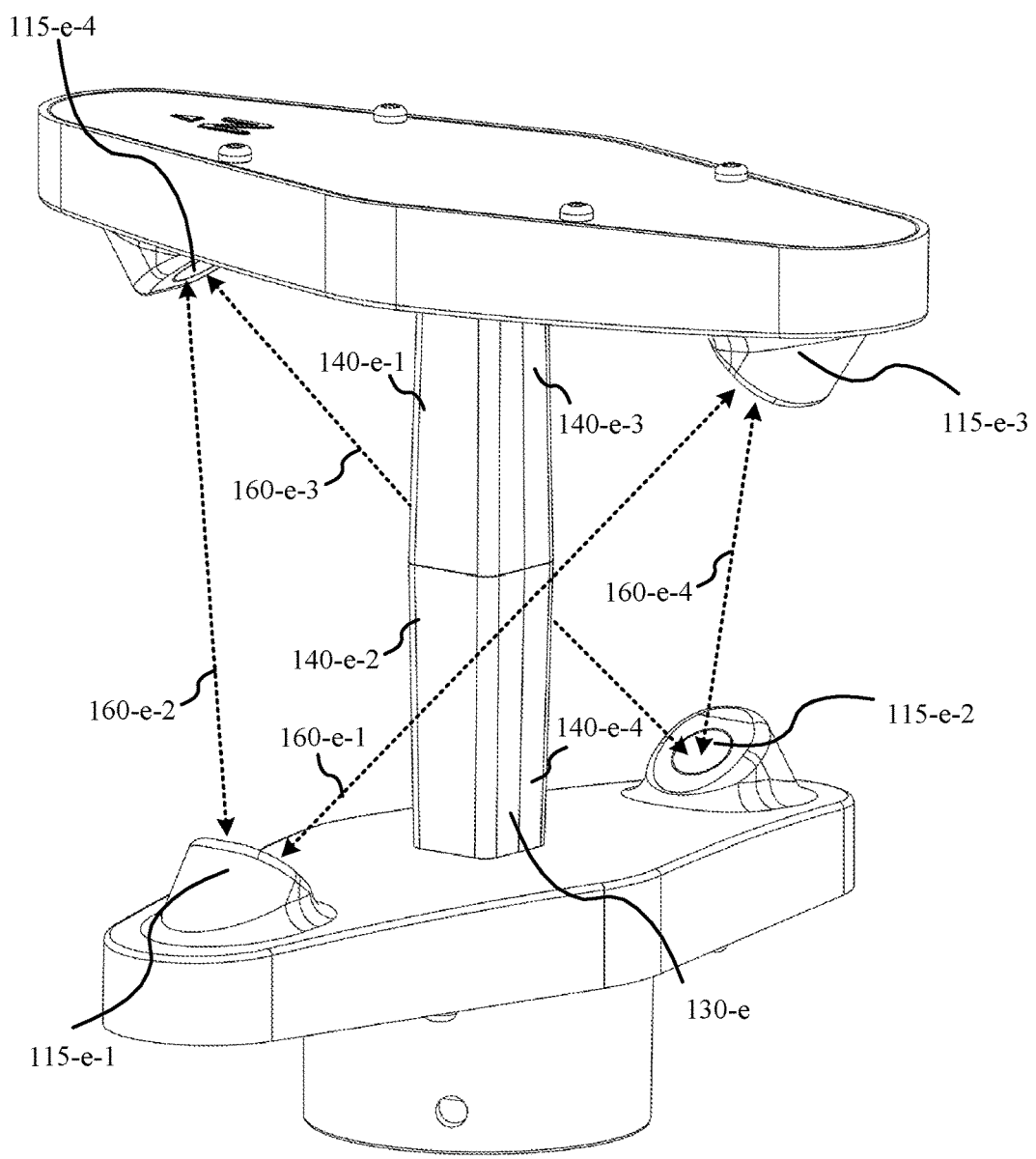
FIG. 3E shows a system in accordance with various embodiments.

Turning now to FIG. 3E, a system 300-a is shown in accordance with various embodiments. System 300-a may be an example of system 100 of FIG. 1A, system 100-b of FIG. 1C, system 100-c of FIG. 1D, and/or system 300 of FIG. 3A. System 300-a may include multiple transducers 115-e-1, 115-e-2, 115-e-3, 115-e-4, which may be examples of acoustic transmitter 110 and/or acoustic receiver 120. While system 300-a shows an example with four transducers 115, other embodiments may include other numbers of transducers. Some embodiments may utilize a separate acoustic transmitter and acoustic receiver in place of each transducer 115. The transducers 115-e-1, 115-e-2, 115-e-3, 115-e-4 may include wide-beam transducers. System 300-a may include support structure 130-e, which may have multiple flat, surface portions; surface portions 140-e-1, 140-e-2, 140-e-3, and 140-e-4 may be seen while four other surface portions may not be seen. Transducers 115-e-1, 115-e-2 may be positioned within an acoustic propagation path of transducers 115-e-3, 115-e-4; similarly, transducers 115-e-3, 115-e-4 may be positioned within an acoustic propagation path of transducers 115-e-1, 115-e-2. Support structure 130-e may be configured to couple the transducers 115-e-1, 115-e-2, 115-e-3, 115-e-4 with each other. Support structure 130-e may be oriented, angled, and/or shaped such that one or more surface portions 140-e-1, 140-e-2, 140-e-3, 140-4, for example, may be configured to hinder a portion of a transmitted acoustic signal from the one or more transducers 115-e-1, 115-e-2, 115-e-3, 115-e-4 from reaching one or more of the other transducers 115-e-1, 115-e-2, 115-e-3, 115-e-4. Support structure 130-e and/or its surface portions 140-e-1, 140-e-2, 140-e-3, 140-e-4 may act as structural interference mitigators. For example, surface portion 140-e-2 may be oriented to present a flat surface to transducer 115-e-1 along with being angled or tilted towards transducer 115-e-1; similarly, surface portion 140-e-3 may be oriented to present a flat surface to transducer 115-e-3 along with being angled or tilted towards transducer 115-e-3. In this embodiment, at least a portion of support structure 130-e is positioned inside tetrahedral configuration formed by the one or more transducers 115-e-1, 115-e-2, 115-e-3, 115-e-4. In some embodiments, at least a portion of support structure 130-e is positioned inside a cone of sound of the one or more transducers 115-e-1, 115-e-2, 115-e-3, 115-e-4.

For example, system 300-a may provide for structural reflection interference mitigation where support structure 130-e may exist inside the perimeter of tetrahedral acoustic propagation paths. System 300-a may provide for structural reflection interference mitigation as an ultrasonic anemometer having support structure 130-e inside the tetrahedral acoustic propagation paths, which may rely on one or more blocking surface portions 140-e-2, 140-e-3, for example, being oriented and angled relative to the cone of sound such that sound is reflected away from receiving transducers.

One may note that the reference lines for transducers 115-e-2 and 115-e-4 may connect with the faces of two of the four transducers, which emit acoustic waves. The other two faces of transducers 115-e-1 and 115-e-3 may not be visible in the figure but are housed in transducer housings, which the reference line for these transducers 115-e-1 and 115-e-3 may connect with in this figure. Although the system shows the use of four transducers 115-e-1, 115-e-2, 115-c-3, 115-e-4, each which may operate as an emitter and receiver by turns, an alternative arrangement of paired separate emitting and receiving probes, such as separate transmitters and receivers, may also be used. In some embodiments, transducer 115-e-1 may be referred to as a first transducer, transducer 115-e-2 may be referred to as a fourth transducer, transducer 115-e-3 may be referred to as a second transducer, and/or transducer 115-e-4 may be referred to as a third transducer.

FIG. 3E may also show multiple acoustic propagation paths 160-e-1, 160-e-2, 160-e-3, 160-e-4 between different combinations of transducers 115-e-1, 115-e-2, 115-e-3, 115-e-4. FIG. 3E may show clear line-of-sight acoustic propagation paths 160-e-1, 160-e-2, 160-e-3, 160-e-4 between different pairs of receiving and transmitting transducers 115-e-1, 115-e-2, 115-e-3, 115-e-4. Properties of these acoustic propagation paths 160-e-1, 160-e-2, 160-e-3, 160-e-4 may allow for the identification of the characteristics of the fluid flow between the respective pairs of transducers. These acoustic propagation paths may form four edges of a tetrahedral pattern. A variety of different sizes of tetrahedral pattern or configuration may be utilized in accordance with various embodiments.

In general, the multiple acoustic propagation paths 160-e-1, 160-e-2, 160-e-3, 160-e-4 may represent portions of acoustic signals transmitted from one or more of the transducers 115-e-1, 115-e-2, 115-e-3, 115-e-4 and/or received at one or more of the transducers 115-e-1, 115-e-2, 115-e-3, 115-e-4. For example, acoustic propagation path 160-e-1 may represent a second portion of a first acoustic signal transmitted from transducer 115-e-1 and received at transducer 115-e-3. Similarly, acoustic propagation path 160-e-1 may represent a second portion of a first acoustic signal transmitted from transducer 115-e-3 and received at transducer 115-*e*-1. Acoustic propagation path 160-*e*-2 may present a third portion of the first acoustic signal transmitted from transducer 115-*e*-1 and received at transducer 115-*e*-4. In some embodiments, transducer 115-*e*-3 receives the second portion of the first acoustic signal transmitted from transducer 115-*e*-1 approximately simultaneously to when the transducer 115-*e*-4 receives the third portion of the first acoustic signal transmitted from transducer 115-*e*-1; this may be a result of the acoustic propagation paths 160-*e*-1 and 160-*e*-2 being configured to be the same length.

Figure 3F:
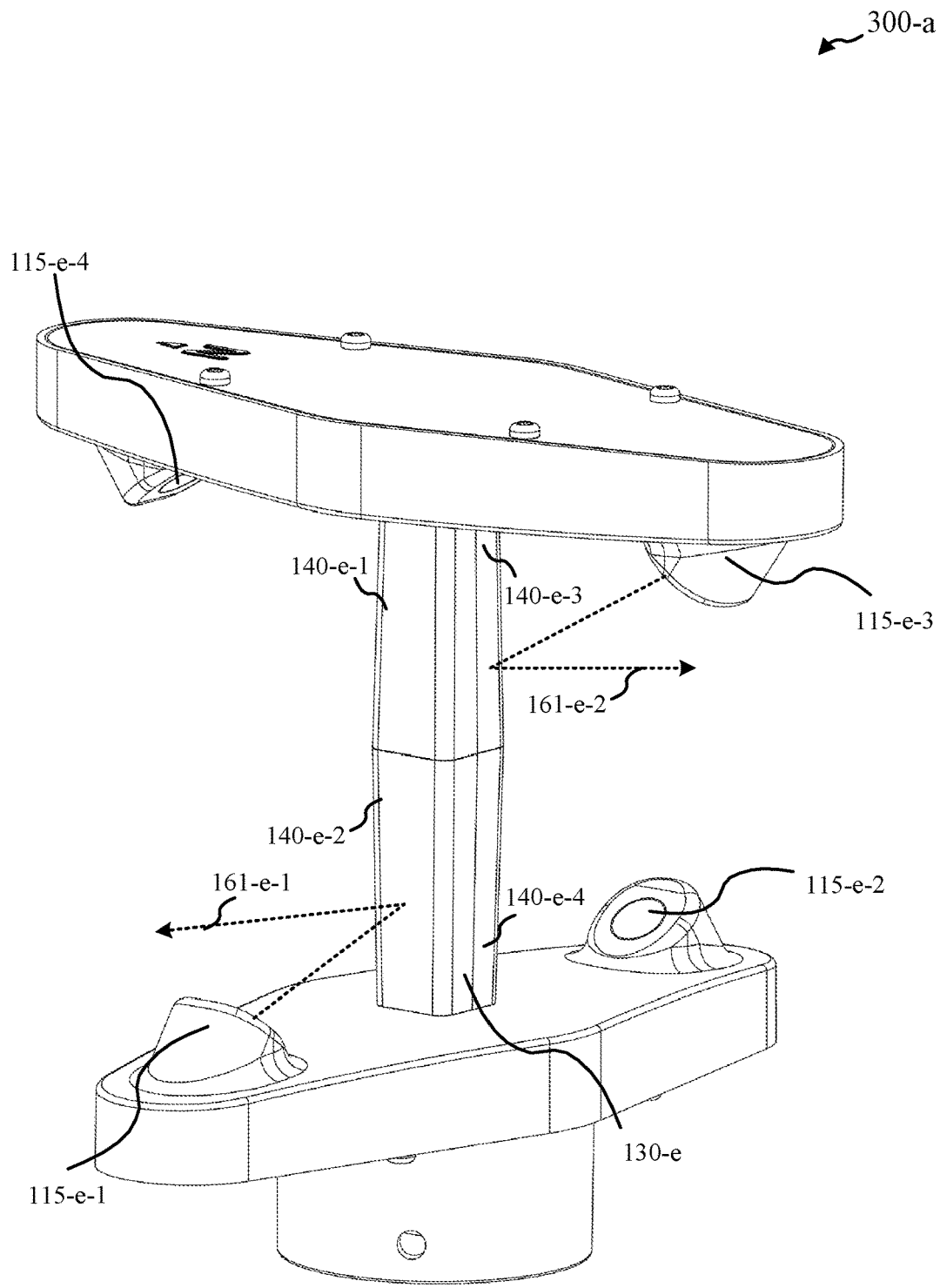
FIG. 3F shows a system in accordance with various embodiments.

FIG. 3F shows system 300-*a* in accordance with various embodiments. For example, FIG. 3F may show sound wave paths 161-*e*-1, 161-*e*-2, within the emitted cone of sound of transducers 115-*e*-1, 115-*e*-3, respectively. FIG. 3F shows that sound waves, rather than reflecting off flat surfaces 140-*e*-2, 140-*e*-3 of support structure 130-*e* and being directed to other transducers such as transducers 115-*e*-4, 115-*e*-2, for example, the sound waves may be reflected away from or otherwise hindered from being received as reflected sound waves off support structures 130-*e* to the other transducers, such as 115-*e*-4, 115-*e*-2. Flat surfaces 140-*e*-2, 140-*e*-3 (and/or surfaces 140-*e*-1, 140-*e*-4) may be oriented with respect to one or more of the transducers and angled towards one or more transducers to present a flat face to the transducers. The support structure 130-*e* may in effect have a tapered upper section and tapered lower section, each with four flat sides, with the widest portion of the upper section and the lower section meeting each other in the middle of the support structure 130-*e*. Paths 161-*e*-1, 161-*e*-2 may be referred to as acoustic interference paths, though the angled and/or oriented flat surfaces 140-*e*-2, 140-*e*-3 may mitigate the potential interference that the paths 161-*e*-1, 161-*e*-2 could have caused.

As noted above with respect to FIG. 3E, transducer 115-*e*-1 may transmit an acoustic signal, which may be referred to as a first acoustic signal transmitted from transducer 115-*e*-1. Path 161-*e*-1 may represent a portion of the first acoustic signal transmitted from transducer 115-*e*-1; in some embodiments, this portion of the first acoustic signal transmitted from transducer 115-*e*-1 may be referred to as a first portion of the first acoustic signal transmitted from the transducer 115-*e*-1; as shown in FIG. 3F, this first portion of the first acoustic signal transmitted from transducer 115-*e*-1 may be hindered from being received at one or more of the transducers, such as transducer 115-*e*-3, through being reflected away from these other transducers due to the orientation and/or angle of the surface 140-*e*-2 of support structure 130-*e*. Similarly, transducer 115-*e*-3 may transmit an acoustic signal, which may be referred to as a second acoustic signal transmitted from transducer 115-*e*-3. Path 161-*e*-2 may represent a portion of the second acoustic signal transmitted from transducer 115-*e*-3; in some embodiments, this portion of the second acoustic signal transmitted from transducer 115-*e*-3 may be referred to as a first portion of the second acoustic signal transmitted from the transducer 115-*e*-3; as shown in FIG. 3F, this first portion of the second acoustic signal transmitted from transducer 115-*e*-3 may be hindered from being received at one or more of the transducers, such as transducer 115-*e*-1, through being reflected away from these other transducers due to the orientation and/or angle of the surface 140-*e*-3 of support structure 130-*e*.

Figure 4A:
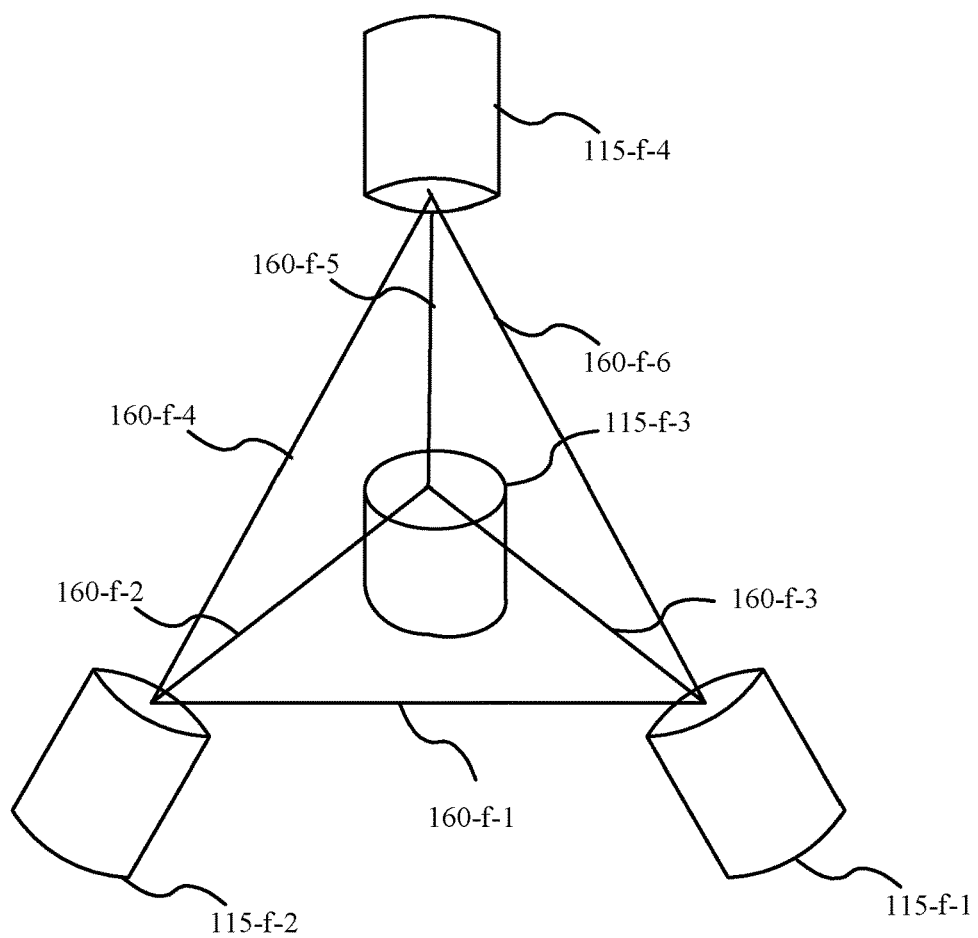
FIG. 4A shows aspects of a system in accordance with various embodiments.

FIG. 4A shows aspects of system 400 in accordance with various embodiments. For example, system 400 may include four transducers 115-*f*-1, 115-*f*-2, 1154-3, 115-*f*-4. FIG. 4A may also show six acoustic propagation paths 1604-1, 160-*f*-2, 160-*f*-3, 160-*f*-4, 160-*f*-5, 160-*f*-6, which may form edges of a tetrahedral pattern or configuration. Different embodiments with respect to those shown in FIG. 1A, FIG. 1B, FIG. 1C, FIG. 1D, FIG. 2A, FIG. 2B, FIG. 2D, FIG. 2E, FIG. 2F, FIG. 2G, FIG. 2H, FIG. 3A, FIG. 3B, FIG. 3C, FIG. 3E, and/or FIG. 3F may utilize one or more of these acoustic propagation paths 1604-1, 160-*f*-2, 160-*f*-3, 160-*f*-4, 160-*f*-5, 160-*f*-6. For example, as noted elsewhere, some embodiments may utilize four of the acoustic propagation paths. This may allow for some redundancy and/or error reduction in measurement. Some embodiments may utilize three acoustic propagation paths. Some embodiments may utilize acoustic propagation paths that may have a clear line-of-sight between transducers. The transducers 115-*f*-1, 115-*f*-2, 115-*f*-3, 115-*f*-4 may include wide-beam transducers. The separations between the 1154-1, 115-*f*-2, 115-*f*-3, 115-*f*-4 may be less than or equal to 150 mm, 100 mm, 50 mm, or 35 mm, though other separations may be utilized.

Figure 4B:
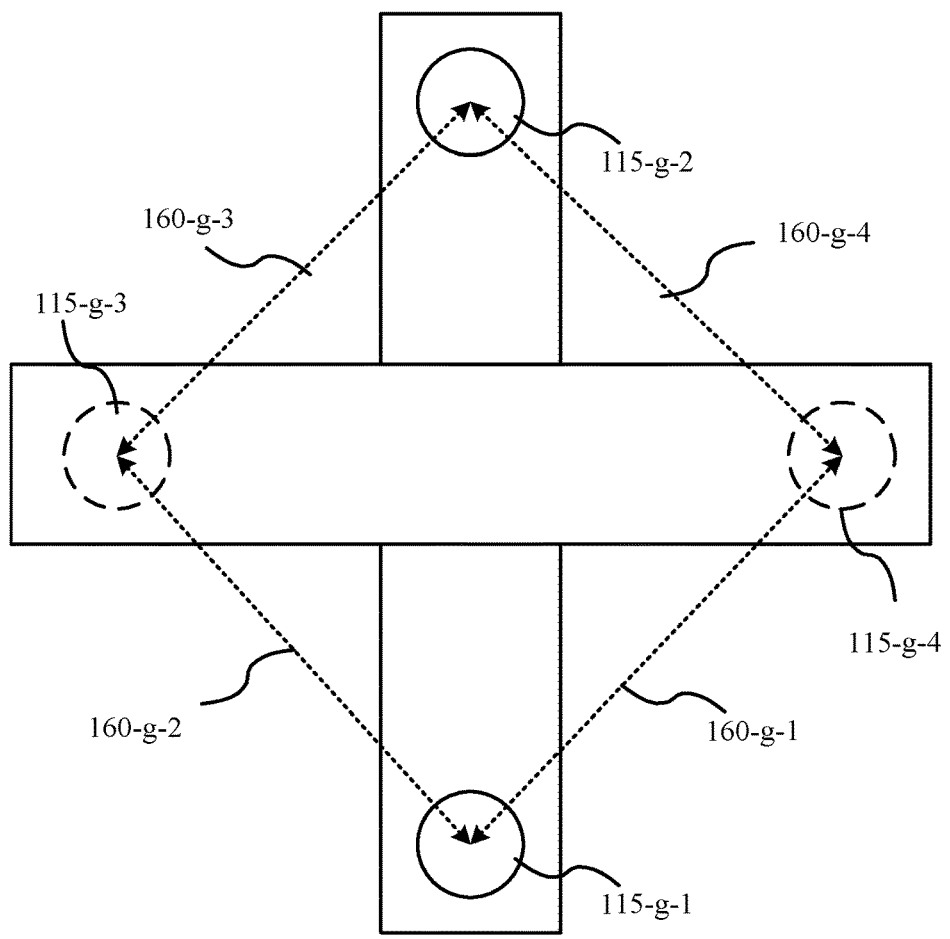
FIG. 4B shows aspects of a system in accordance with various embodiments.

FIG. 4B shows a top-down view of a system 400-*a* in accordance with various embodiments. For example, system 400-*a* may show four transducers 115-*g*-1, 115-*g*-2, 115-*g*-3, 115-*g*-4. FIG. 4A may also show four acoustic propagation paths 160-*g*-1, 160-*g*-2, 160-*g*-3, 160-*g*-4 which may form four edges of a tetrahedral pattern. System 400-*a* may provide an example of aspects of the systems shown in FIG. 1A, FIG. 1B, FIG. 1C, FIG. 1D, FIG. 2A, FIG. 2B, FIG. 2D, FIG. 2E, FIG. 2F, FIG. 2G, FIG. 2H, FIG. 3A, FIG. 3B, FIG. 3C, FIG. 3E, FIG. 3F, and/or FIG. 4A. This figure may show how the transducers may transmit to each other in a variety of ways. For example, transducers 115-*g*-1, 115-*g*-2, 115-*g*-3, 115-*g*-4 may transmit in a cycle with the order of transmission involving the following sequence of transducers: 115-*g*-1, 115-*g*-2, 115-*g*-3, 115-*g*-4. This cycle may help reduce the impact of transducer ring down on measurements. Other cycles may be utilized, including, but not limited to, the order 115-*g*-1, 115-*g*-3, 115-*g*-2, 115-*g*-4. The transducers 115-*g*-1, 115-*g*-2, 115-*g*-3, 115-*g*-4 may include wide-beam transducers.

Some embodiments may utilize simultaneous detection by multiple transducers from signals sent from individual transducers. For example, transducer 115-*g*-1 may transmit an acoustic signal that may be received and/or detected simultaneously by transducers 115-*g*-3 and 115-*g*-4 along acoustic propagation paths 160-*g*-2 and 160-*g*-1. Transducer 115-*g*-3 may receive and/or detect a portion of an acoustic signal (along acoustic propagation path 160-*g*-2) from transducer 115-*g*-1 simultaneously to when transducer 115-*g*-4 receives and/or detects another portion of the acoustic signal (along acoustic propagation path 160-*g*-1) from transducer 115-*g*-1. The other transducers may be utilized in similar ways such that each transmitted signal from a transducer may be received and/or detected by two other transducers. This may reduce the number of transmissions involved to gather time of flight information for a variety of purposes such as wind speed, wind direction, wind velocity, etc. One may note that some embodiments, however, may utilize configurations such that for each transmission from a transducer, information is only utilized from one receiving transducer rather than two transducers. In some embodiments, transducer 115-*g*-1 may be referred to as a first transducer, transducer 115-*g*-2 may be referred to as a fourth transducer, transducer 115-*g*-3 may be referred to as a second transducer, and/or transducer 115-*g*-4 may be referred to as a third transducer.

Figure 5:
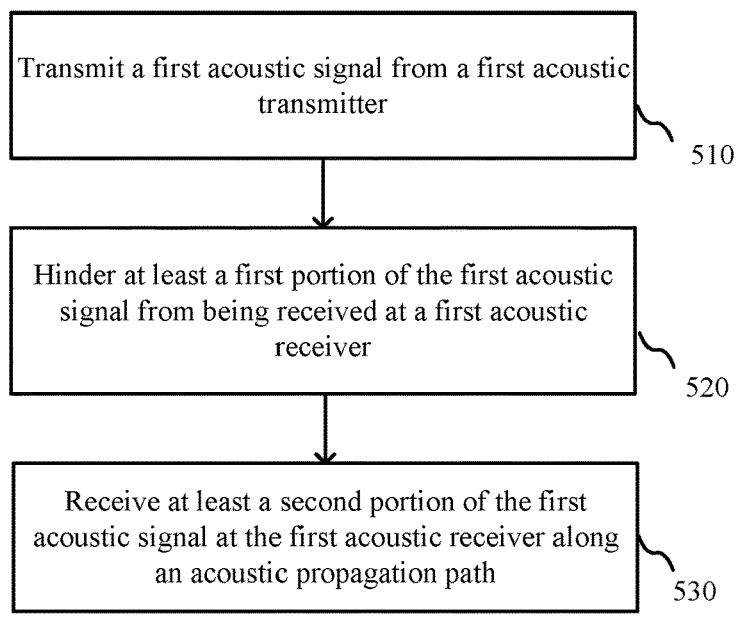
FIG. 5 shows a flow diagram of a method in accordance with various embodiments.

Turning now to FIG. 5, a flow diagram of a method 500 is shown in accordance with various embodiments. The method may be referred to as a method of acoustic structural reflection interference mitigation. Method 500 may be implemented utilizing a variety of systems and/or devices such as those shown and/or described with respect to FIG. 1A, FIG. 1B, FIG. 1C, FIG. 1D, FIG. 2A, FIG. 2B, FIG. 2D, FIG. 2E, FIG. 2F, FIG. 2G, FIG. 2H, FIG. 3A, FIG. 3B, FIG. 3C, FIG. 3E, FIG. 3F, FIG. 4A, and/or FIG. 4B.

At block 510, a first acoustic signal may be transmitted from a first acoustic transmitter. At block 510, at least a first portion of the first acoustic signal from the first acoustic transmitter may be hindered from being received at a first acoustic receiver. At block 530, at least a second portion of the first acoustic signal from the first acoustic transmitter may be received at the first acoustic receiver along an acoustic propagation path. In some embodiments, the acoustic propagation path between the first acoustic transmitter and the first acoustic receiver is less than or equal to 150 mm and the first acoustic transmitter includes a wide-beam transmitter.

In some embodiments of the method 500, hindering at least the first portion of the first acoustic signal from the first acoustic transmitter includes scattering at least a portion of the first portion of the first acoustic signal off one or more physical projections coupled with a portion of one or more support structures coupling the first acoustic transmitter with the first acoustic receiver. In some embodiments, hindering at least the first portion of the first acoustic signal from the first acoustic transmitter includes reflecting at least a portion of the first portion of the first acoustic signal off a portion of one or more support structures coupling the first acoustic transmitter with the first acoustic receiver; the portion of the one or more support structures may be at least angled or oriented such that the portion of the first portion of the first acoustic signal is reflected away from the first acoustic receiver.

Some embodiments of the method 500 include receiving at least a third portion of the first acoustic signal from the first acoustic transmitter at a second acoustic receiver. In some embodiments, the first acoustic receiver receives the second portion of the first acoustic signal from the first acoustic transmitter simultaneously to when the second acoustic receiver receives the third portion of the first acoustic signal from the first acoustic transmitter.

In some embodiments of the method 500, a first transducer includes the first acoustic transmitter and a second transducer includes the first acoustic receiver. Some embodiments further include: transmitting a second acoustic signal from the second transducer; hindering at least a first portion of the second acoustic signal from the second transducer from being received at the first transducer; and/or receiving at least a second portion of the second acoustic signal from the second transducer at the first transducer along the acoustic propagation path. Some embodiments include determining a time of flight based on the second received portion of the first acoustic signal and a time of flight based on the second received portion of the second acoustic signal. Some embodiments include determining at least a speed of sound or a wind speed utilizing the time of flight based on the second received portion of the first acoustic signal and the time of flight based on the second received portion of the second acoustic signal. Some embodiments include determining an air temperature based on the determined speed of sound.

Some embodiments of the method 500 include utilizing the first transducer, the second transducer, a third transducer, and a fourth transducer at respective apices of a tetrahedron. In some embodiments, the one or more transducers include wide-beam transducers.

Some embodiments include determining at least: a time of flight based on the second received portion of the first acoustic signal from the first transducer received at the second transducer and a time of flight based on the second received portion of the second acoustic signal transmitted from the second transducer received at the first transducer; a time of flight based on a third received portion of the first acoustic signal from the first transducer received at the third transducer and a time of flight based on a first received portion of a third acoustic signal from the third transducer received at the first transducer; a time of flight based on a third received portion of the second acoustic signal from the second transducer received at the fourth transducer and a time of flight based on a first received portion of a fourth acoustic signal from the fourth transducer received at the second transducer; or a time of flight based on a second received portion of the third acoustic signal from the third transducer received at the fourth transducer and a time of flight based on a second received portion of a fourth acoustic signal from the fourth transducer received at the third transducer. Some embodiments include determining at least a wind velocity, a wind speed, or a wind direction utilizing at least three of the following: the time of flight based on the second received portion of the first acoustic signal from the first transducer received at the second transducer and the time of flight based on the second received portion of the second acoustic signal transmitted from the second transducer received at the first transducer; the time of flight based on the third received portion of the first acoustic signal from the first transducer received at the third transducer and the time of flight based on the first received portion of the third acoustic signal from the third transducer received at the first transducer; the time of flight based on a third received portion of the second acoustic signal from the second transducer received at the fourth transducer and the time of flight based on a first received portion of the fourth acoustic signal from the fourth transducer received at the second transducer; and/or the time of flight based on the second received portion of the third acoustic signal from the third transducer received at the fourth transducer and the time of flight based on the second received portion of the fourth acoustic signal from the fourth transducer received at the third transducer.

In some embodiments of the method 500, the first transducer, the second transducer, the third transducer, and the fourth transducer transmit in a cycle with the order of transmission involving the following sequence of transducers: the first transducer; the fourth transducer, the second transducer; and the third transducer. In some embodiments, a separation (or acoustic propagation path distances) between the one or more transducers is less than or equal to 150 mm, 100 mm, 50 mm, or 35 mm.

These embodiments may not capture the full extent of combination and permutations of materials and process equipment. However, they may demonstrate the range of applicability of the methods, devices, and/or systems. The different embodiments may utilize more or fewer stages than those described.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various stages may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the embodiments.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail to avoid obscuring the embodiments.

Also, it is noted that the embodiments may be described as a process which may be depicted as a flow diagram or block diagram or as stages. Although each may describe the operations as a sequential process, many of the operations can be performed in parallel or concurrently. In addition, the order of the operations may be rearranged. A process may have additional stages not included in the figure.

Having described several embodiments, it will be recognized by those of skill in the art that various modifications, alternative constructions, and equivalents may be used without departing from the spirit of the different embodiments. For example, the above elements may merely be a component of a larger system, wherein other rules may take precedence over or otherwise modify the application of the different embodiments. Also, one or more stages may be undertaken before, during, or after the above elements are considered. Accordingly, the above description should not be taken as limiting the scope of the different embodiments.

What is claimed is:

1. A method of acoustic structural reflection interference mitigation comprising:
   transmitting a first acoustic signal from a first acoustic transmitter;
   utilizing one or more structural interference mitigators positioned to avoid allowing one or more reflections of the first acoustic signal from reaching at least a first acoustic receiver or a second acoustic receiver; and
   receiving at least a first portion of the first acoustic signal at the first acoustic receiver along a first acoustic propagation path and at least a second portion of the first acoustic signal at the second acoustic receiver along a second acoustic propagation path.

2. The method of claim 1, wherein utilizing the one or more structural interference mitigators positioned to avoid allowing the one or more reflections of the first acoustic signal from reaching at least the first acoustic receiver or the second acoustic receiver includes scattering the one or more reflections of the first acoustic signal off one or more physical projections coupled with a portion of one or more support structures coupling the first acoustic transmitter with the first acoustic receiver.

3. The method of claim 1, wherein utilizing the one or more structural interference mitigators positioned to avoid allowing the one or more reflections of the first acoustic signal from reaching at least the first acoustic receiver or the second acoustic receiver includes reflecting the one or more reflections of the first acoustic signal off a portion of one or more support structures coupling the first acoustic transmitter with the first acoustic receiver, wherein the portion of the one or more support structures is at least angled or oriented such that the one or more reflections of the first acoustic signal are reflected away from at least the first acoustic receiver or the second acoustic receiver.

4. The method of claim 1, wherein the first acoustic receiver receives the first portion of the first acoustic signal simultaneously to when the second acoustic receiver receives the second portion of the first acoustic signal.

5. The method of claim 1, wherein a first transducer includes the first acoustic transmitter and a second transducer includes the first acoustic receiver.

6. The method of claim 5, further comprising:
   transmitting a second acoustic signal from the second transducer;
   utilizing one or more structural interference mitigators positioned to avoid allowing one or more reflections of the second acoustic signal from reaching the first transducer; and
   receiving at least a first portion of the second acoustic signal at the first transducer along the first acoustic propagation path.

7. The method of claim 6, further comprising determining a time of flight based on the first received portion of the first acoustic signal and a time of flight based on the first received portion of the second acoustic signal.

8. The method of claim 7, further comprising determining at least a speed of sound or a wind speed utilizing the time of flight based on the first received portion of the first acoustic signal and the time of flight based on the first received portion of the second acoustic signal.

9. The method of claim 6, further comprising utilizing the first transducer, the second transducer, a third transducer, and a fourth transducer at respective apices of a tetrahedron, wherein the third transducer includes the second acoustic receiver.

10. The method of claim 9, wherein the first transducer, the second transducer, the third transducer, and the fourth transducer are configured as wide-beam transducers.

11. The method of claim 10, further comprising determining at least:
   a time of flight based on the first received portion of the first acoustic signal from the first transducer received at the second transducer and a time of flight based on the first received portion of the second acoustic signal transmitted from the second transducer received at the first transducer;
   a time of flight based on the second received portion of the first acoustic signal from the first transducer received at the third transducer and a time of flight based on a first received portion of a third acoustic signal from the third transducer received at the first transducer;
   a time of flight based on a second received portion of the second acoustic signal from the second transducer received at the fourth transducer and a time of flight based on a first received portion of a fourth acoustic signal from the fourth transducer received at the second transducer; or
   a time of flight based on a second received portion of the third acoustic signal from the third transducer received at the fourth transducer and a time of flight based on a second received portion of a fourth acoustic signal from the fourth transducer received at the third transducer.

12. The method of claim 11, further comprising determining at least a wind velocity, a wind speed, or a wind direction utilizing at least three of the following:
   the time of flight based on the first received portion of the first acoustic signal from the first transducer received at the second transducer and the time of flight based on the first received portion of the second acoustic signal transmitted from the second transducer received at the first transducer;
   the time of flight based on the second received portion of the first acoustic signal from the first transducer received at the third transducer and the time of flight based on the first received portion of the third acoustic signal from the third transducer received at the first transducer;

the time of flight based on the second received portion of the second acoustic signal from the second transducer received at the fourth transducer and the time of flight based on the first received portion of the fourth acoustic signal from the fourth transducer received at the second transducer; and the time of flight based on the second received portion of the third acoustic signal from the third transducer received at the fourth transducer and the time of flight based on the second received portion of the fourth acoustic signal from the fourth transducer received at the third transducer.

13. The method of claim 11, wherein the first transducer, the second transducer, the third transducer, and the fourth transducer transmit in a cycle with an order of transmission involving the following sequence of transducers: the first transducer; the fourth transducer; the second transducer; and the third transducer.

14. The method of claim 8, further comprising determining an air temperature based on the determined speed of sound.

15. The method of claim 1, wherein the first acoustic propagation path between the first acoustic transmitter and the first acoustic receiver is less than or equal to 150 mm and the first acoustic transmitter includes a wide-beam transmitter.

16. An acoustic measurement system comprising:
a first acoustic transmitter;
a first acoustic receiver, wherein the first acoustic receiver is positioned within a first acoustic propagation path of the first acoustic transmitter;
a second acoustic receiver, wherein the second acoustic receiver is positioned within a second acoustic propagation path of the first acoustic transmitter;
one or more support structures configured to couple at least the first acoustic transmitter with the first acoustic receiver or the first acoustic receiver with the second acoustic receiver; and
one or more structural interference mitigators positioned to avoid allowing one or more reflections of a first acoustic signal from the first acoustic transmitter from reaching at least the first acoustic receiver or the second acoustic receiver.

17. The system of claim 16, wherein the one or more structural interference mitigators include one or more projections from the one or more support structures.

18. The system of claim 16, wherein the one or more structural interference mitigators include at least an oriented or an angled portion of the one or more support structures.

19. The system of claim 16, wherein a first transducer includes the first acoustic transmitter and a second transducer includes the first acoustic receiver.

20. The system of claim 19, wherein one or more of the structural interference mitigators are positioned to avoid allowing one or more reflections of a second acoustic signal from the second transducer from reaching the first transducer.

21. The system of claim 20, further comprising a processor configured to determine at least a wind speed or a speed of sound based on the first acoustic signal transmitted from the first transducer to the second transducer along the first acoustic propagation path and the second acoustic signal transmitted from the second transducer to the first transducer along the first acoustic propagation path.

22. The system of claim 20, further comprising:
a third transducer, wherein the third transducer includes the second acoustic receiver; and
a fourth transducer, wherein the first transducer, the second transducer, the third transducer, and the fourth transducer are positioned at respective apices of a tetrahedron.

23. The system of claim 22, wherein the first transducer, the second transducer, the third transducer, and the fourth transducer are configured as wide-beam transducers.

24. The system of claim 23, wherein at least a portion of the one or more support structures is positioned outside a tetrahedral configuration formed by the first transducer, the second transducer, the third transducer, and the fourth transducer.

25. The system of claim 23, wherein at least a portion of the one or more support structures is positioned inside a tetrahedral configuration formed by the first transducer, the second transducer, the third transducer, and the fourth transducer.

26. The system of claim 23, further comprising a processor configured to determine at least:
a time of flight based on a first received portion of the first acoustic signal from the first transducer received at the second transducer and a time of flight based on a first received portion of the second acoustic signal transmitted from the second transducer received at the first transducer;
a time of flight based on a second received portion of the first acoustic signal from the first transducer received at the third transducer and a time of flight based on a first received portion of a third acoustic signal from the third transducer received at the first transducer;
a time of flight based on a second received portion of the second acoustic signal from the second transducer received at the fourth transducer and a time of flight based on a first received portion of a fourth acoustic signal from the fourth transducer received at the second transducer; or
a time of flight based on a second received portion of the third acoustic signal from the third transducer received at the fourth transducer and a time of flight based on a second received portion of a fourth acoustic signal from the fourth transducer received at the third transducer.

27. The system of claim 26, wherein the processor is further configured to determine at least a wind velocity, a wind direction, or a wind speed based on utilizing at least of three of the following:
the time of flight based on the first received portion of the first acoustic signal from the first transducer received at the second transducer and the time of flight based on the first received portion of the second acoustic signal transmitted from the second transducer received at the first transducer;
the time of flight based on the second received portion of the first acoustic signal from the first transducer received at the third transducer and the time of flight based on the first received portion of the third acoustic signal from the third transducer received at the first transducer;
the time of flight based on the second received portion of the second acoustic signal from the second transducer received at the fourth transducer and the time of flight based on the first received portion of the fourth acoustic signal from the fourth transducer received at the second transducer; and the time of flight based on the second received portion of the third acoustic signal from the third transducer received at the fourth transducer and the time of flight based on the second received portion of the fourth acoustic signal from the fourth transducer received at the third transducer.

28. The system of claim 22, wherein the first transducer, the second transducer, the third transducer, and the fourth transducer transmit in a cycle with an order of transmission involving the following sequence of transducers: the first transducer; the fourth transducer; the second transducer; and the third transducer.

29. The system of claim 21, wherein the processor is further configured to determine an air temperature based on the determined speed of sound.

30. The system of claim 16, wherein the first acoustic transmitter and the first acoustic receiver are positioned such that the first acoustic propagation path between the first acoustic transmitter and the first acoustic receiver is less than or equal to 150 mm and the first acoustic transmitter includes a wide-beam transmitter.

* * * * *